US012293568B2

(12) United States Patent
Ranganathan et al.

(10) Patent No.: US 12,293,568 B2
(45) Date of Patent: May 6, 2025

(54) SYSTEM AND METHOD FOR FACIAL RECOGNITION

(71) Applicant: Verizon Patent and Licensing Inc., Basking Ridge, NJ (US)

(72) Inventors: Prakash Ranganathan, Tamilnadu (IN); Nithya Vasudevan, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 440 days.

(21) Appl. No.: 17/741,495

(22) Filed: May 11, 2022

(65) Prior Publication Data
US 2023/0368502 A1    Nov. 16, 2023

(51) Int. Cl.
*G06V 10/774* (2022.01)
*G06V 10/44* (2022.01)
*G06V 40/16* (2022.01)

(52) U.S. Cl.
CPC .......... *G06V 10/774* (2022.01); *G06V 10/454* (2022.01); *G06V 40/171* (2022.01)

(58) Field of Classification Search
CPC .. G06V 10/774; G06V 10/454; G06V 40/171; G06V 10/772; G06V 10/82
See application file for complete search history.

(56) References Cited

U.S. PATENT DOCUMENTS

| 10,891,517 | B2 * | 1/2021 | Zhang | G06N 7/01 |
| 2015/0078628 | A1 * | 3/2015 | Anderson | G06F 18/22 |
| | | | | 382/218 |
| 2015/0095996 | A1 * | 4/2015 | Tang | G06V 40/174 |
| | | | | 726/6 |
| 2015/0178554 | A1 * | 6/2015 | Kanaujia | G06T 19/20 |
| | | | | 382/118 |
| 2017/0351909 | A1 * | 12/2017 | Kaehler | G06V 40/171 |
| 2019/0303651 | A1 * | 10/2019 | Gallagher | G06V 40/166 |
| 2020/0074153 | A1 * | 3/2020 | Yang | G06V 20/647 |
| 2022/0383662 | A1 * | 12/2022 | Javan Roshtkhari | G06N 3/08 |
| 2023/0040513 | A1 * | 2/2023 | Ryan | G06V 20/52 |

FOREIGN PATENT DOCUMENTS

CN    105488478    *    4/2020

OTHER PUBLICATIONS

Y.-J. Cho and K.-J. Yoon, "PaMM: Pose-Aware Multi-Shot Matching for Improving Person Re-Identification," in IEEE Transactions on Image Processing, vol. 27, No. 8, pp. 3739-3752, Aug. 2018, doi: 10.1109/TIP.2018.2815840. (Year: 2018).*

(Continued)

*Primary Examiner* — Andrae S Allison

(57) ABSTRACT

In an example, based upon a first image of a face of a first person, a plurality of augmented images may be generated. Based upon the first image and the plurality of augmented images, a first set of facial feature representations may be generated. A second image comprising a representation of a face of a second person may be identified. A second facial feature representation may be generated based upon the second image. It may be determined, based upon the second facial feature representation and the first set of facial feature representations, that the second person is the first person.

20 Claims, 10 Drawing Sheets

(56) References Cited

OTHER PUBLICATIONS

A. Borgia, Y. Hua, E. Kodirov and N. Robertson, "GAN-Based Pose-Aware Regulation for Video-Based Person Re-Identification," 2019 IEEE Winter Conference on Applications of Computer Vision (WACV), Waikoloa, HI, USA, 2019, pp. 1175-1184, doi: 10.1109/WACV.2019.00130. (Year: 2019).*

Ge, Yixiao, et al. "Fd-gan: Pose-guided feature distilling gan for robust person re-identification." Advances in neural information processing systems 31 (2018). (Year: 2018).*

Song, D. Gong, Z. Li, C. Liu and W. Liu, "Occlusion Robust Face Recognition Based on Mask Learning With Pairwise Differential Siamese Network," 2019 IEEE/CVF International Conference on Computer Vision (ICCV), Seoul, Korea (South), 2019, (Year: 2019).*

* cited by examiner

SYSTEM AND METHOD FOR FACIAL RECOGNITION

BACKGROUND

Facial recognition technology may be used to determine an identity of a face in an image. In an example, facial recognition may be used to authenticate users through identity verification services. However, the effectiveness and/or accuracy of a facial recognition system is important, and some facial verification systems have been abandoned and/or are no longer in use due to their ineffectiveness.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION OF EXAMPLE EMBODIMENTS

Figure 1A:
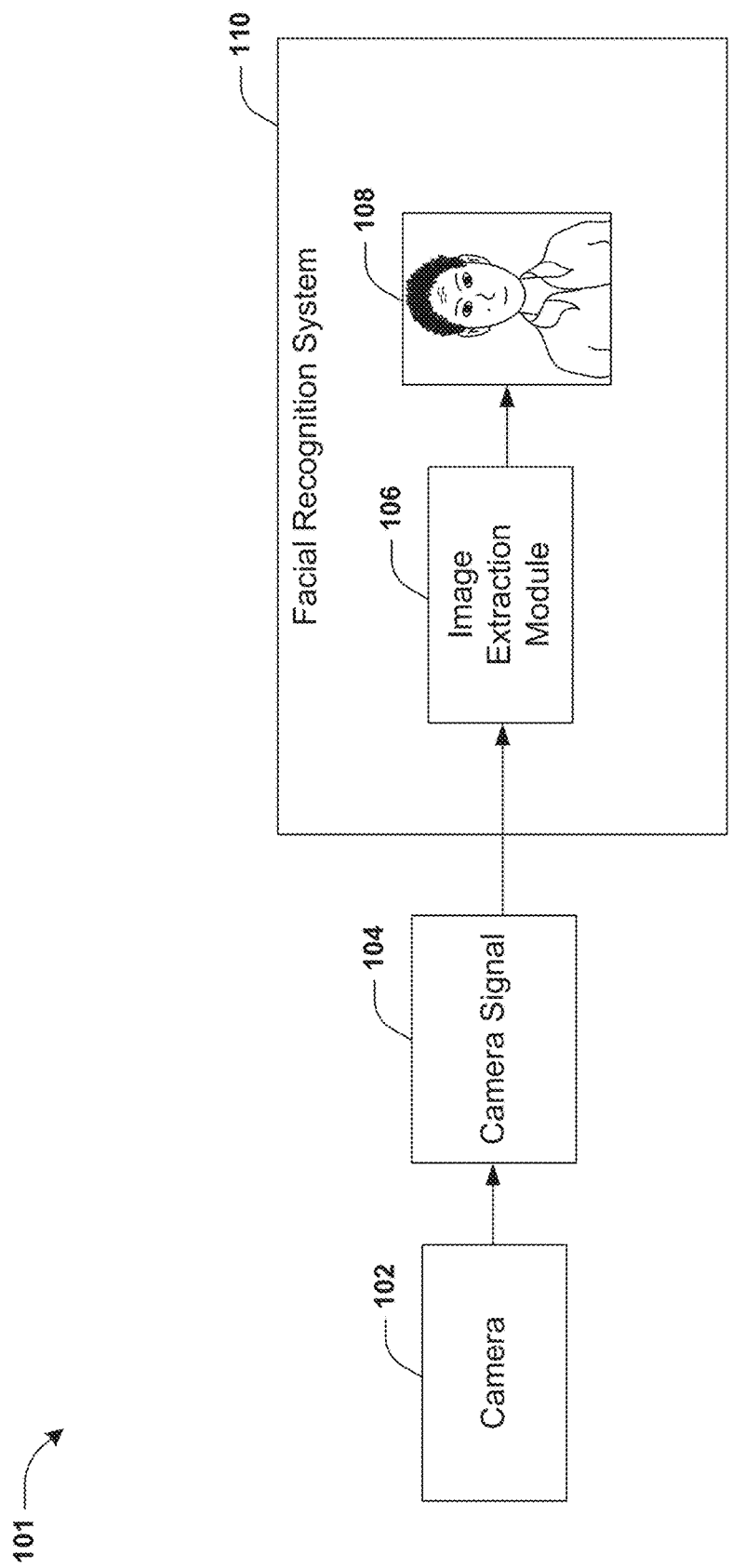
FIG. 1A is a diagram illustrating an example system for performing facial recognition, where a first image comprising a representation of a face of a first person is identified according to some embodiments.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of scenarios in which the disclosed subject matter may be utilized and/or implemented.

One or more systems and/or techniques for performing facial recognition are provided. Facial recognition may be used to determine an identity of a face in an image. In an example, facial recognition may be used to authenticate users through identity verification services. For example, a facial recognition system may obtain one or more first images of a person, and may later determine whether or not a face in a second image matches the person in the one or more first images. However, some facial recognition systems may fail to accurately determine whether or not the face in the second image matches the person in the one or more first images due to the following issues: (i) pose variations, such as a difference in an angular position of a face in the one or more first images and an angular position of a face in the second image; (ii) illumination variations, such as differences in lighting conditions between the one or more first images and the second image, which may cause facial features in the one or more first images to appear differently than in the second image, even if the one or more first images and the second image include identical faces; and/or (iii) occlusion of facial regions, such as where parts of a face are blocked in the one or more first images and/or the second image, such as due to a person wearing glasses, wearing goggles, having facial hair, wearing a cap, wearing a mask, etc.

In accordance with one or more of the techniques provided herein, a facial recognition system is provided. The facial recognition system is configured to identify a person based upon an image of a face of the person. The facial recognition system may implement one-shot learning (and/or other type of learning) for learning information from one or more first images of a face of a person, where the learned information can later be used to identify and/or recognize the person in one or more second images. The one-shot learning may be implemented using a machine learning model (e.g., a neural network model), such as using one or more of the techniques provided herein with respect to FIGS. 1A-1F and/or FIG. 2.

Using one or more of the techniques provided herein, the facial recognition system may more accurately determine identities of people in images, even in cases with pose variation, illumination variation, and/or facial region occlusion. In an example, a first image of face of a person may be identified. The first image may be used to generate a plurality of augmented images, such as a first set of one or more augmented images with pose variations, a second set of one or more augmented images with occlusion of facial regions, a third set of one or more augmented images with illumination variations and/or one or more other sets of augmented images. A machine learning model (e.g., a neural network model) may be used to generate a set of facial feature representations based upon the first image and/or the plurality of augmented images. For example, the set of facial feature representations may comprise a first facial feature representation that is based upon the first image (e.g., the source image) and a plurality of facial feature representations based upon the plurality of augmented images. The set of facial feature representations may be used, by the facial recognition system, to determine whether or not a face in an image matches the person in the first image. For example, a second image of a person (e.g., an unknown person) may be identified. The facial recognition system may generate, using the machine learning model, a second facial feature representation based upon the second image. The second facial feature representation and the set of facial feature representations may be used to determine whether or not the person in the second image matches the person in the first image. For example, the second facial feature representation may be compared with each facial feature representation of the set of facial feature representations to determine whether or not the person in the second image matches the person in the first image. It may be appreciated that by generating the plurality of augmented images having pose variations, occlusion of facial regions, and/or illumination variations, by generating the plurality of facial feature representations based upon the augmented images and/or by using the set of facial feature representations comprising the plurality of facial feature representations to determine whether or not the person in the second image matches the person in the first image, the facial recognition system may more accurately determine whether or not the person in the second image matches the person in the first image, even if there is a difference in angular position of face, lighting conditions, and/or facial region occlusion between the first image and the second image.

In some systems, multiple facial feature representations that are generated based upon different images of a person (e.g., augmented images and/or images with pose variations) of a person may be combined into a single representation in a canonical form (e.g., via many to one normalization of facial feature representations). These systems may use the single representation to determine whether or not a person in an image matches the person associated with the facial feature representations. However, combining the multiple facial feature representations into the single representation results in information and/or knowledge of the multiple facial feature representations becoming lost, and thus, facial recognition performed using these systems may be less accurate than performing facial recognition in accordance with the present disclosure. For example, comparing the second facial feature representation with facial feature representations of the first set of facial feature representations (individually, for example) may result in a more accurate determination of whether or not the person in the second image matches the person in the first image than merely using the single facial feature representation.

In accordance with one or more of the techniques provided herein, the machine learning model may comprise a plurality of convolution filter blocks associated with a plurality of sets of facial regions. For example, each convolution filter block of the plurality of convolution filter blocks is associated with a set of one or more facial regions of the plurality of sets of facial regions and is configured to generate, based upon an input image, a region-focused facial feature representation focused on the set of one or more facial regions. Alternatively and/or additionally, the machine learning model may comprise a conditional attention layer configured to generate weights associated with region-focused facial feature representations output by the plurality of convolution filter blocks. The weights generated by the conditional attention layer may be applied to outputs of the plurality of convolution filter blocks to generate a facial feature representation of an image (e.g., a facial feature representation of the first set of facial feature representations). In some examples, the weights may be based upon rates at which appearances of facial regions of the plurality of sets of facial regions change over time. For example, a weight to be applied to a region-focused facial feature representation that is focused on one or more facial regions may have a relationship with (e.g., an inverse relationship with) a rate at which an appearance of the one or more facial regions changes over time. In an example, a weight applied to a region-focused facial feature representation that is focused on the nose may be higher than a weight applied to a region-focused facial feature representation that is focused on the moustache area and/or beard area, since a rate at which a nose of a person changes in appearance over time may typically be less than a rate at which a moustache area and/or beard area changes in appearance over time, and thus, feature information focused on the nose may be more reliably used for facial recognition than feature information focused on the moustache area and/or beard area since the feature information focused on the moustache area and/or beard area is more likely to be outdated due to a person letting their facial hair grow to a different hair length or shaving and/or trimming their facial hair to a different style. Accordingly, using the plurality of convolution filter blocks and/or the conditional attention layer as provided herein, the facial recognition system may more accurately correctly determine that a person in the second image matches the person in the first image even if the person has a different style of facial hair and/or head hair in the second image than the first image.

In accordance with one or more of the techniques provided herein, the first image and/or the second image may be extracted from videos. For example, the first image may be extracted from a video having a duration of at least about 10 seconds, such as between about 10 seconds and about 20 seconds. Video frames of the video may be analyzed based upon at least one of lighting condition, brightness, sharpness, smoothness, angular position of face, etc. to determine scores associated with the video frames, wherein a video frame may be selected from the video frames based upon the scores (e.g., based upon a determination that the video frame has the highest score among the determined scores). The selected video frame may be used to generate a facial feature representation for use by the facial recognition system. Analyzing the video frames to determine the scores, and/or selecting a video frame based upon the scores may result in higher quality images being used for facial recognition (as compared to systems that use low quality images with poor pixel clarity, for example), and thus, may result in more accurate facial recognition (such as due to one or more facial feature representations, generated based upon the first image, being more accurate representations of facial features of the person in the first image as a result of the first image being a higher quality image).

FIGS. 1A-1F illustrate examples of a system 101 for performing facial recognition. FIG. 1A illustrates identification of a first image 108 comprising a representation of a face of a first person. The first image 108 may be used to learn information (e.g., one or more facial feature representations) to be later used in identifying and/or recognizing the first person in other images (other than the first image 108). The facial recognition system (shown with reference number 110) may receive a first camera signal 104 from a first camera 102. In an example, the first camera 102 may be a camera that is mounted on and/or embedded in a client device (e.g., a laptop, a smartphone, a tablet, a wearable device, etc.). Alternatively and/or additionally, the first camera 102 may be a standalone camera (e.g., the first camera 102 may be a security camera and/or a different type of camera, such as a webcam and/or an external camera, that may or may not be mounted on a client device). In an example, the first camera 102 may be a video surveillance camera (e.g., a closed-circuit television (CCTV) camera), wherein the first camera signal 104 may carry footage (e.g., CCTV footage) captured via the first camera 102.

In an example, the first camera signal 104 may comprise the first image 108 captured using the first camera 102. Alternatively and/or additionally, the first camera signal 104 may comprise a video (e.g., CCTV footage) captured using the first camera 102, wherein the first image 108 may be extracted from the video. In some examples, the video may have a duration of at least about 10 seconds, such as between about 10 seconds and about 20 seconds. The first image 108 may be extracted from the video using an image extraction module 106. The first image 108 may correspond to (and/or may be generated based upon) a video frame, of the video, that the image extraction module 106 selects from among a plurality of video frames of the video. In an example in which the video is 10 seconds and a frame rate of the video is 24 frames per second (fps), the plurality of video frames of the video may comprise about 240 frames.

A plurality of scores associated with the plurality of video frames may be determined. In some examples, a score of the plurality of scores (and/or each score of the plurality of scores) is associated with a video frame of the plurality of video frames of the video, where the score may be indicative of a quality of the video frame and/or a potential usefulness of the video frame for purposes of generating one or more facial feature representations that can later be used for facial recognition. In an example, a score of the plurality of scores (and/or each score of the plurality of scores) is based upon one or more properties of a video frame of the plurality of video frames, such as at least one of a lighting condition of the video frame, a brightness of the video frame, a sharpness of the video frame, a smoothness of the video frame, etc. A video frame of the plurality of video frames may be analyzed (using one or more image analysis techniques, for example) to determine the one or more properties, and the one or more properties may be used to determine a score, of the plurality of scores, associated with the video frame. In an example, the plurality of scores may comprise a first score associated with a first video frame of the plurality of video frames (e.g., the first score may be generated based upon at least one of a lighting condition of the first video frame, a brightness of the first video frame, a sharpness of the first video frame, a smoothness of the first video frame, etc.), a second score associated with a second video frame of the plurality of video frames, etc. In some examples, the first video frame may be selected from the plurality of video frames based upon the plurality of scores, such as based upon a determination that the first score associated with the first video frame is the highest score of the plurality of scores. Alternatively and/or additionally, the first video frame may be selected from the plurality of video frames based upon a determination that an angular position of the face of the first person in the first video frame corresponds to frontal position (e.g., the face of the first person is facing the first camera 102 when the first video frame is captured). In an example, video frames, of the plurality of video frames, in which the face of the first person is in an angular position other than frontal position, may not be considered for selection (e.g., a video frame in which the face of the first person is in an angular position other than frontal position may not be selected from among the plurality of video frames). Alternatively and/or additionally, the plurality of scores may be generated based upon differences between angular positions of the face of the first person (in the plurality of video frames) and a frontal angular position of the face. For example, a first difference between an angular position of the face of the first person in the first video frame and the frontal angular position may be determined, wherein the first score may be generated based upon the first difference (e.g., the first score may be a function of the first difference, wherein an increase of the first difference may correspond to a decrease of the first score). Based upon the selection of the first video frame, the first video frame may be used to learn information (e.g., one or more facial feature representations) to be later used in identifying and/or recognizing the first person in other images (other than the first image 108). For example, the first image 108 (to be used by the facial recognition system 110 to generate one or more facial feature representations, for example) may be generated based upon the first video frame (and/or the first image 108 may be the first video frame).

Figure 1B:
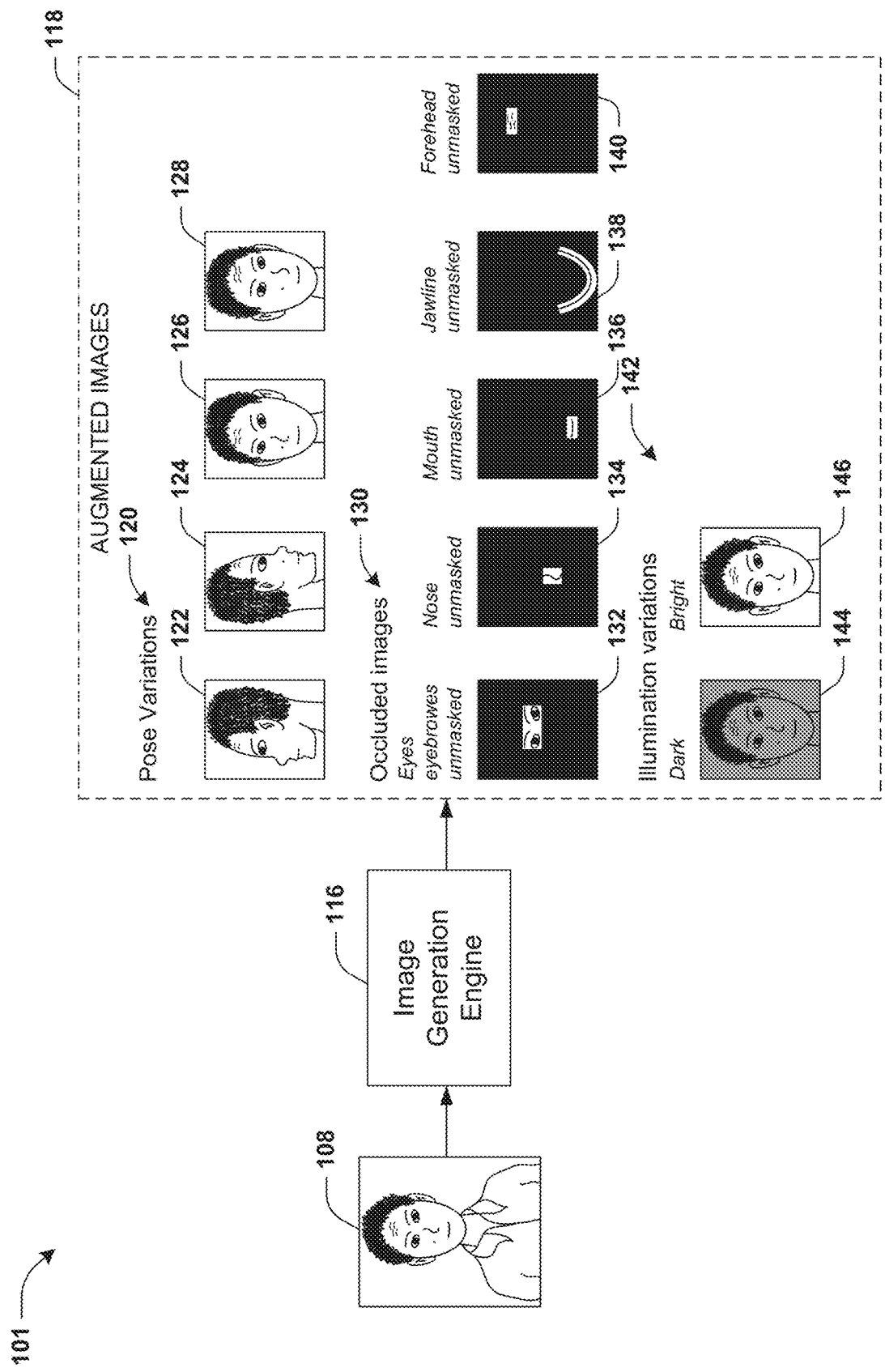
FIG. 1B is a diagram illustrating an example system for performing facial recognition, where an image generation engine generates a plurality of augmented images according to some embodiments.
Figure 1C:
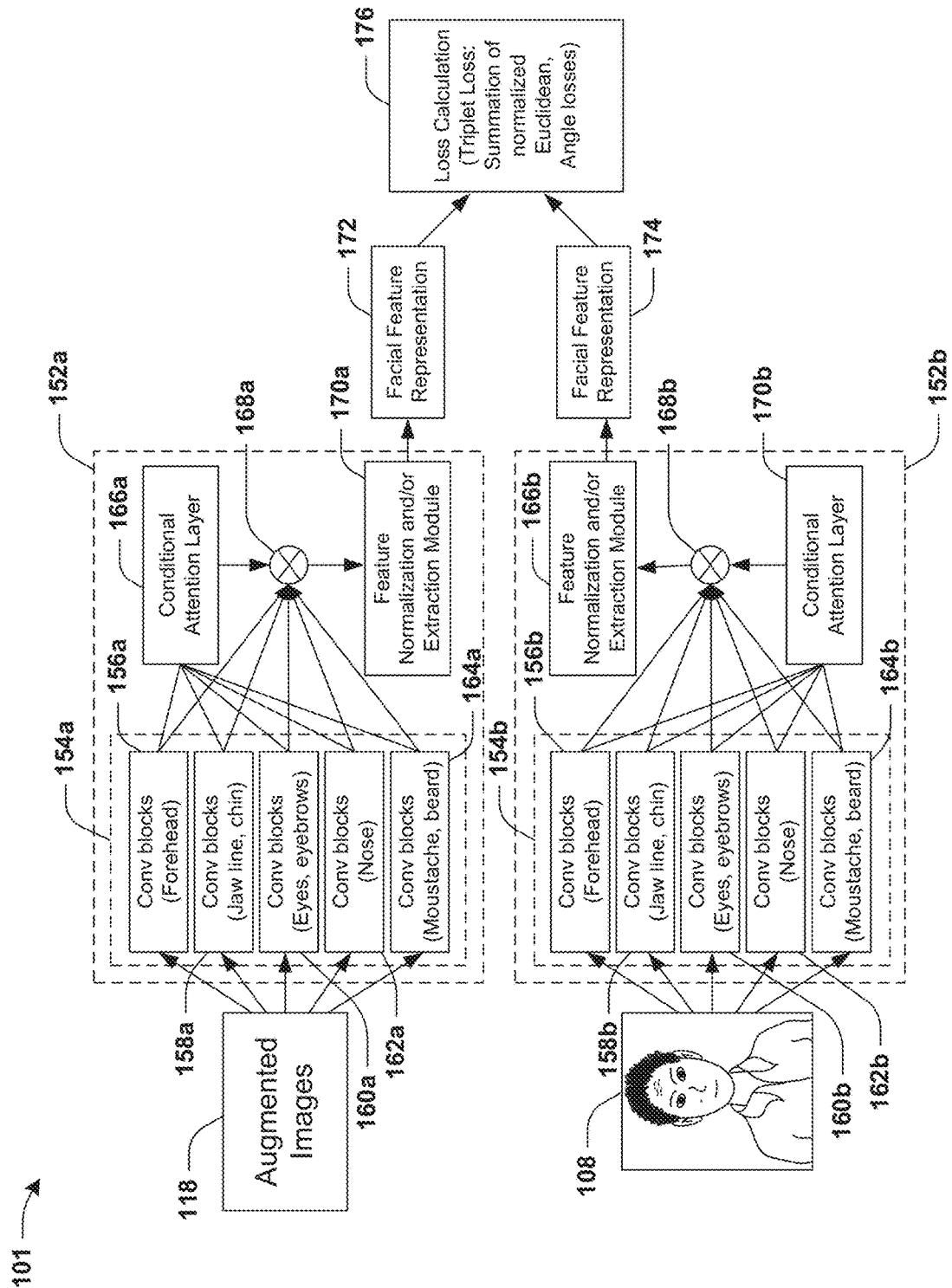
FIG. 1O is a diagram illustrating an example system for performing facial recognition, where facial feature representations are generated using a machine learning model according to some embodiments.
FIG. 1D is a diagram illustrating a model architecture of a machine learning model of an example system for performing facial recognition, according to some embodiments.
FIG. 1E is a diagram illustrating an example system for performing facial recognition, where a fifth facial feature representation is generated based upon a second image according to some embodiments.
FIG. 1F is a diagram illustrating an example system for performing facial recognition, where a fifth facial feature representation and a facial recognition data store are used to identify a second person in a second image according to some embodiments.
Figure 1D:
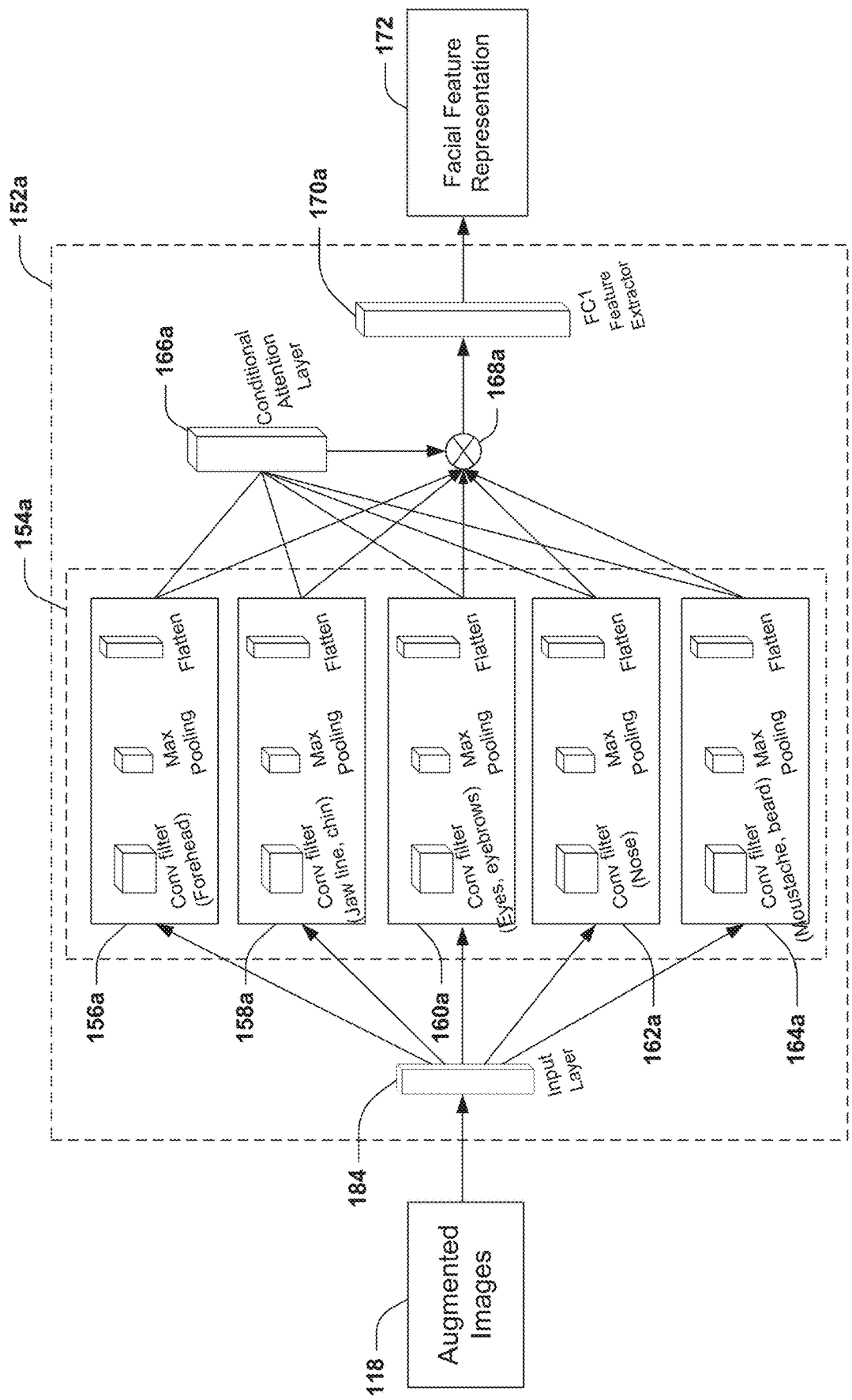
Figure 1E:
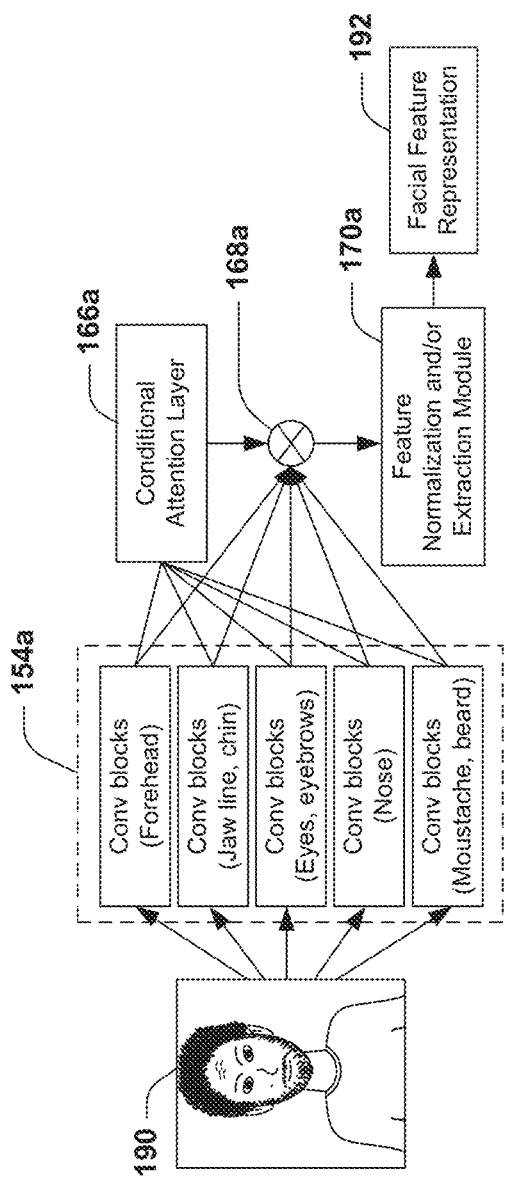
Figure 1F:
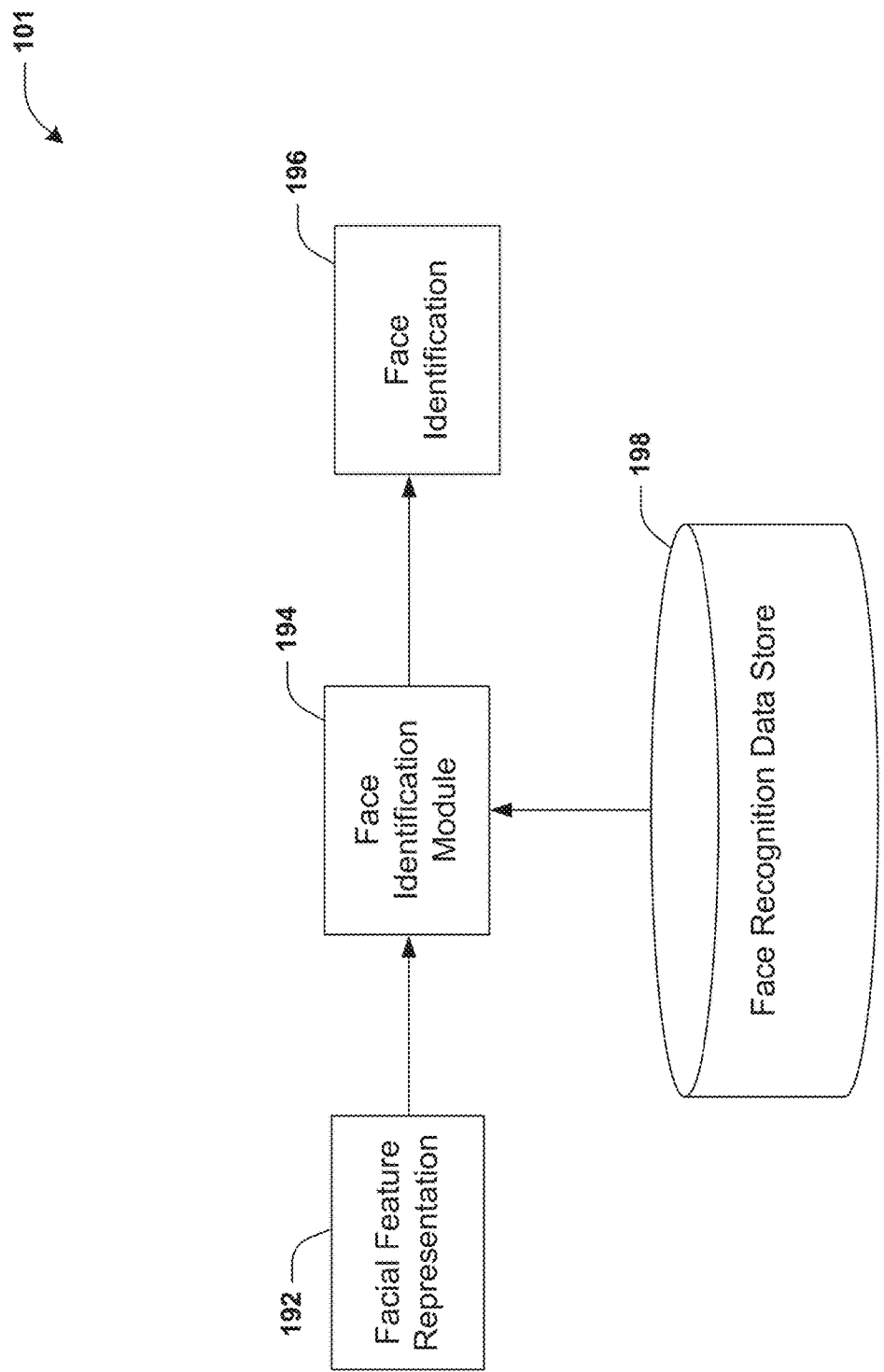
Figure 2:
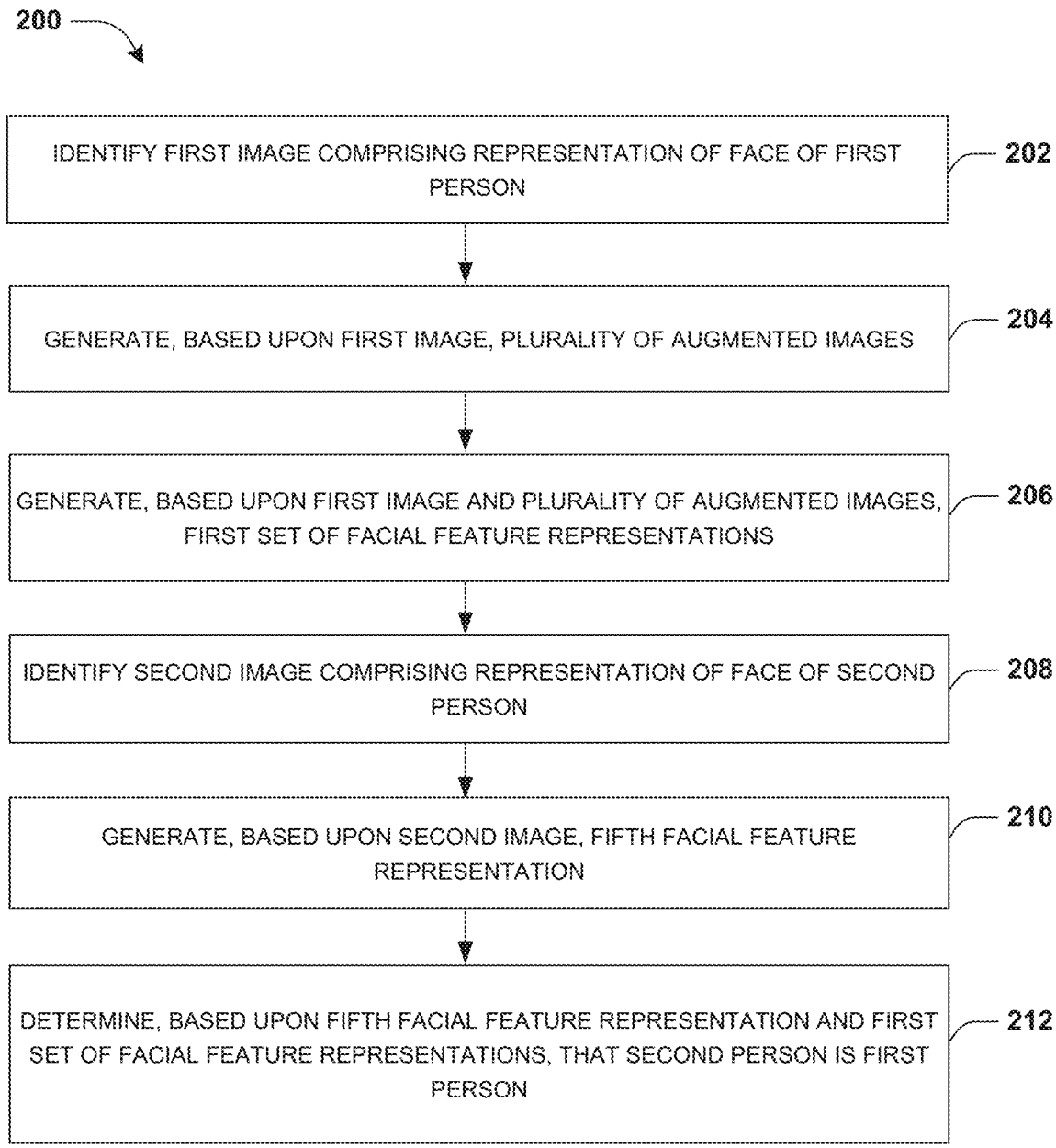
FIG. 2 is a flow chart illustrating an example method for performing facial recognition, according to some embodiments.

An embodiment of performing facial recognition is illustrated by an exemplary method 200 of FIG. 2, and is further described in conjunction with the system 101 of FIGS. 1A-1F. At 202, the first image 108 (comprising a representation of the face of the first person) is identified.

At 204, a plurality of augmented images is generated based upon the first image 108. FIG. 1B illustrates generation of the plurality of augmented images (shown with reference number 118). The plurality of augmented images 118 may be generated, by an image generation engine 116, based upon the first image 108. In an example, the first image 108 may be augmented (by the image generation engine 116, for example) to generate an image of the plurality of augmented images 118.

In some examples, the plurality of augmented images 118 may comprise a first set of one or more augmented images 120 (e.g., images with pose variations), a second set of one or more augmented images 130 (e.g., occluded images), a third set of one or more augmented images 142 (e.g., images with illumination variations) and/or one or more other sets of augmented images.

The image generation engine 116 may generate the first set of augmented images 120 such that each image of the first set of augmented images 120 comprises a representation of the face of the first person having an angular position (e.g., a pose) different than an angular position (e.g., frontal position) of the face of the first person in the first image 108. For example, the first set of augmented images 120 may comprise images associated with multiple angular positions, such as an image 122 of the face of the first person in a first lateral position, an image 124 of the face of the first person in a second lateral position (opposite the first lateral position, for example), an image 126 of the face of the first person in a first ¾ position, an image 128 of the face of the first person in a second ¾ position (opposite the first ¾ position, for example), etc.

The image generation engine 116 may generate the second set of augmented images 130 such that each image of the second set of augmented images 130 comprises one or more unmasked regions and one or more masked regions. For example, the image generation engine 116 may mask one or more regions, of the first image 108, to generate an image of the second set of augmented images 130. In some examples, facial regions that are masked and/or unmasked may vary across the second set of augmented images 130. For example, the second set of augmented images 130 may comprise an image 132 in which a facial region comprising eyes and/or eyebrows of the first person is unmasked and/or other facial regions (other than the facial region comprising the eyes and/or the eyebrows) are masked. Alternatively and/or additionally, the second set of augmented images 130 may comprise an image 134 in which a facial region comprising a nose of the first person is unmasked and/or other facial regions (other than the facial region comprising the nose) are masked. Alternatively and/or additionally, the second set of augmented images 130 may comprise an image 136 in which a facial region, comprising a mouth, an upper lip and/or a moustache area of the first person, is unmasked and/or other facial regions (other than the facial region comprising the mouth, the upper lip and/or the moustache area) are masked. Alternatively and/or additionally, the second set of augmented images 130 may comprise an image 138 in which a facial region, comprising a jawline and/or a chin of the first person, is unmasked and/or other facial regions (other than the facial region comprising the jawline and/or the chin) are masked. Alternatively and/or additionally, the second set of augmented images 130 may comprise an image 140 in which a facial region, comprising a forehead of the first person, is unmasked and/or other facial regions (other than the facial region comprising the forehead) are masked. In some examples, a region of an image of the second set of augmented images 130 may be masked by making the region a certain color, such as white, black, and/or other color (e.g., in the example shown in FIG. 1B, masked regions are black). Alternatively and/or additionally, a region of an image of the second set of augmented images 130 may be masked by adding noise to the region (such that the region is blurry, for example). In some examples, a masked region of an image of the second set of augmented images 130 may be masked by making pixels of the masked region a certain value and/or color, such as white, black, and/or other color (e.g., in the example shown in FIG. 1B, masked regions are black). Alternatively and/or additionally, a region of an image of the second set of augmented images 130 may be masked by adding noise to the masked region (such that the masked region is blurry and/or still contains at least some information from the first image 108, for example).

The image generation engine 116 may generate the third set of augmented images 142 such that each image of the third set of augmented images 142 comprises a representation of the face of the first person in a lighting condition different than a lighting condition of the first image 108. For example, the third set of augmented images 142 may comprise images associated with multiple lighting conditions, such as an image 144 of the face of the first person in a first lighting condition (e.g., dark lighting condition), an image 146 of the face of the first person in a second lighting condition (e.g., bright lighting condition brighter than the first lighting condition), etc.

At 206, a first set of facial feature representations is generated based upon the first image 108 and the plurality of augmented images 118. For example, for each image of a plurality of images comprising the first image 108 and the plurality of augmented images 118, the first set of facial feature representations may comprise a facial feature representation that is generated based upon the image. For example, the first set of facial feature representations may comprise a first facial feature representation generated based upon the first image 108 and a first plurality of facial feature representations generated based upon the plurality of augmented images 118 (e.g., each facial feature representation of the first plurality of facial feature representations is generated based upon an image of the plurality of augmented images 118). The first set of facial feature representations may be generated using a machine learning model, such as at least one of a tree-based model, a machine learning model used to perform linear regression, a machine learning model used to perform logistic regression, a decision tree model, a support vector machine (SVM), a Bayesian network model, a k-Nearest Neighbors (kNN) model, a K-Means model, a random forest model, a machine learning model used to perform dimensional reduction, a machine learning model used to perform gradient boosting, etc. In an example, the machine learning model comprises a neural network model (e.g., a deep neural network model), such as a convolutional neural network (CNN) model.

The machine learning model (e.g., the neural network model, such as the CNN model) may comprise a plurality of convolution filter blocks associated with a plurality of sets of facial regions. For example, each convolution filter block of the plurality of convolution filter blocks is associated with a set of one or more facial regions of the plurality of sets of facial regions and is configured to generate, based upon an input image, a region-focused facial feature representation focused on the set of one or more facial regions. Alternatively and/or additionally, the machine learning model (e.g., the neural network model, such as the CNN model) may comprise a conditional attention layer configured to generate weights associated with region-focused facial feature representations output by the plurality of convolution filter blocks. The weights generated by the conditional attention layer may be applied to outputs of the plurality of convolution filter blocks to generate a facial feature representation of an image (e.g., the first image 108 and/or an image of the plurality of augmented images 118).

In an example, for each set of one or more facial regions of the plurality of sets of facial regions, the plurality of convolution filter blocks may comprise a convolution filter block that is configured to generate region-focused facial feature representations that are focused on the set of one or more facial regions. In an example, the plurality of convolution filter blocks comprise: (i) a first convolution filter block associated with a first set of one or more facial regions comprising a forehead (e.g., the first convolution filter block may be configured to generate, based upon an input image, a region-focused facial feature representation that is focused on the forehead of a face in the input image, such as where the region-focused facial feature representation is a vector representation of one or more regions comprising the forehead, and/or where other regions, other than the one or more regions comprising the forehead, are masked by the first convolution filter block); (ii) a second convolution filter block associated with a second set of one or more facial regions comprising a jaw line and/or a chin (e.g., the second convolution filter block may be configured to generate, based upon an input image, a region-focused facial feature representation that is focused on the jaw line and/or chin of a face in the input image, such as where the region-focused facial feature representation is a vector representation of one or more regions comprising the jaw line and/or chin, and/or where other regions, other than the one or more regions comprising the jaw line and/or chin, are masked by the second convolution filter block); (iii) a third convolution filter block associated with a third set of one or more facial regions comprising eyes and/or eyebrows (e.g., the third convolution filter block may be configured to generate, based upon an input image, a region-focused facial feature representation that is focused on the eyes and/or eyebrows of a face in the input image, such as where the region-focused facial feature representation is a vector representation of one or more regions comprising the eyes and/or eyebrows, and/or where other regions, other than the one or more regions comprising the eyes and/or eyebrows, are masked by the third convolution filter block); (iv) a fourth convolution filter block associated with a fourth set of one or more facial regions comprising a nose (e.g., the fourth convolution filter block may be configured to generate, based upon an input image, a region-focused facial feature representation that is focused on the nose of a face in the input image, such as where the region-focused facial feature representation is a vector representation of one or more regions comprising the nose, and/or where other regions, other than the one or more regions comprising the nose, are masked by the fourth convolution filter block); (v) a fifth convolution filter block associated with a fifth set of one or more facial regions comprising a moustache area and/or beard area (e.g., the fifth convolution filter block may be configured to generate, based upon an input image, a region-focused facial feature representation that is focused on the moustache area and/or beard area of a face in the input image, such as where the region-focused facial feature representation is a vector representation of one or more regions comprising the moustache area and/or beard area, and/or where other regions, other than the one or more regions comprising the moustache area and/or beard area, are masked by the fifth convolution filter block); (vi) and/or one or more other convolution filter blocks associated with one or more other sets of one or more facial regions.

In some examples, a facial feature representation of the first set of facial feature representations is generated, using the plurality of convolution filter blocks and/or the conditional attention layer, based upon an input image (e.g., the first image 108 or an image of the plurality of augmented images 118). The plurality of convolution filter blocks may be used to generate a plurality of region-focused facial feature representations that may be used to generate the facial feature representation. In an example, each convolution filter block of the plurality of convolution filter blocks is used to generate a region-focused facial feature representation, of the plurality of region-focused facial feature representations, based upon the input image. For example, the input image (and/or information extracted from the input image) may be input to each convolution filter block of the plurality of convolution filter blocks, where, based upon the input image: (i) the first convolution filter block may output a region-focused facial feature representation (of the plurality of region-focused facial feature representations) that focuses on the first set of one or more facial regions; (ii) the second convolution filter block may output a region-focused facial feature representation (of the plurality of region-focused facial feature representations) that focuses on the second set of one or more facial regions; (iii) the third convolution filter block may output a region-focused facial feature representation (of the plurality of region-focused facial feature representations) that focuses on the third set of one or more facial regions; (iv) the fourth convolution filter block may output a region-focused facial feature representation (of the plurality of region-focused facial feature representations) that focuses on the fourth set of one or more facial regions; (v) the fifth convolution filter block may output a region-focused facial feature representation (of the plurality of region-focused facial feature representations) that focuses on the fifth set of one or more facial regions; etc. In some examples, the conditional attention layer may determine a plurality of weights associated with the plurality of region-focused facial feature representations. Each weight of the plurality of weights is associated with (e.g., applicable to) a region-focused facial feature representation of the plurality of region-focused facial feature representations. In some examples, the plurality of weights may be generated in a random (e.g., pseudo-random) manner (e.g., a value of a weight of the plurality of weights may be a random value). Alternatively and/or additionally, the plurality of weights may be generated by the conditional attention layer based upon learned information (e.g., information learned via training performed on the machine learning model). Accordingly, different weights may be applied to region-focused facial feature representations that are focused on different facial regions (e.g., a weight applied to a region-focused facial feature representation that is focused on the first set of one or more facial regions (e.g., forehead) may be different than a weight applied to a region-focused facial feature representation that is focused on the second set of one or more facial regions (e.g., jaw line and/or chin). In some examples, the plurality of weights may be based upon rates at which appearances of facial regions of the plurality of sets of facial regions change over time. For example, a weight to be applied to a region-focused facial feature representation that is focused on one or more facial regions may have a relationship with (e.g., an inverse relationship with) a rate at which an appearance of the one or more facial regions changes over time. In an example, a weight applied to a region-focused facial feature representation that is focused on the fourth set of one or more facial regions (e.g., nose) may be higher than a weight applied to a region-focused facial feature representation that is focused on the fifth set of one or more facial regions (e.g., moustache area and/or beard area) since a rate at which a nose of a person changes in appearance over time may typically be less than a rate at which a moustache area and/or beard area changes in appearance over time, and thus, feature information focused on the nose may be more reliably used for facial recognition than feature information focused on the moustache area and/or beard area since the feature information focused on the moustache area and/or beard area is more likely to be outdated due to a person letting their facial hair grow to a different hair length or shaving and/or trimming their facial hair to a different style. In an example, based upon information learned from training performed on the machine learning model, the conditional attention layer may give higher weights to region-focused facial feature representations associated with at least one of eyes, eyebrows, cheekbone, nose, etc. than to region-focused facial feature representations associated with other facial regions. In some examples, the plurality of region-focused facial feature representations may be combined with the plurality of weights to generate the facial feature representation of the first set of facial feature representations (e.g., the plurality of region-focused facial feature representations may be multiplied with the plurality of weights element-wise to generate the facial feature representation, wherein multiplying the plurality of region-focused facial feature representations with the plurality of weights element-wise may normalize the region-focused facial feature representation). It may be appreciated that by using the plurality of convolution filter blocks to generate the plurality of region-focused facial feature representations and/or by applying weights of the plurality of weights to the plurality of region-focused facial feature representations (wherein the weights are based upon how quickly appearances of facial regions change over time, for example), the facial recognition system 110 may more accurately determine that a person in a different image (other than the first image 108) matches the first person, even if the first person has different style of facial hair in the different image than in the first image (such as due to applying a lower weight to one or more facial regions associated with facial hair than other facial regions that are associated with slower rates of change in appearance). For example, even though the second image 190 of the first person (discussed below with respect to FIGS. 1E-1F) shows the first person having a different style of facial hair than in the first image 108 (e.g., the first person has a beard and/or moustache in the second image 190 and the first person does not have a beard and/or moustache in the first image 108), the facial recognition system may accurately determine that the person in the second image 190 is the first person in the first image 108.

FIG. 1C illustrates generation of facial feature representations using the machine learning model. In some examples, such as in the example shown in FIG. 1O, the machine learning model (e.g., the neural network model, such as the CNN model) has a Siamese neural network architecture. For example, the machine learning model may comprise a first subnetwork 152a and a second subnetwork 152b. In some examples, weights and/or a configuration of the first subnetwork 152a may be identical to weights and/or a configuration of the second subnetwork 152b (e.g., the first subnetwork 152s may be identical to the second subnetwork 152b). Alternatively and/or additionally, the second subnetwork 152b may be a clone of the first subnetwork 152a.

In some examples, each subnetwork of the first subnetwork 152a and the second subnetwork 152b comprises the plurality of convolution filter blocks and/or the conditional attention layer. For example, the first subnetwork 152a may comprise a first instance of the plurality of convolution filter blocks (shown with reference number 154a) and the second subnetwork 152b may comprise a second instance of the plurality of convolution filter blocks (shown with reference number 154b), wherein the plurality of convolution filter blocks 154a may be identical to the plurality of convolution filter blocks 154b. Alternatively and/or additionally, the first subnetwork 152a may comprise a first instance of the conditional attention layer (shown with reference number 166a) and the second subnetwork 152b may comprise a second instance of the conditional attention layer (shown with reference number 166b), wherein the conditional attention layer 166a may be identical to the conditional attention layer 166b.

As shown in FIG. 1O, the first instance of the plurality of convolution filter blocks 154a and the second instance of the plurality of convolution filter blocks 154b may each comprise the first convolution filter block (shown with reference numbers 156a, 156b) associated with the first set of one or more facial regions comprising a forehead, the second convolution filter block (shown with reference numbers 158a, 158b) associated with the second set of one or more facial regions comprising a jaw line and/or a chin, the third convolution filter block (shown with reference numbers 160a, 160b) associated with the third set of one or more facial regions comprising eyes and/or eyebrows, the fourth convolution filter block (shown with reference numbers 162a, 162b) associated with the fourth set of one or more facial regions comprising a nose, and/or the fifth convolution filter block (shown with reference numbers 164a, 164b) associated with the fifth set of one or more facial regions comprising a moustache area and/or beard area.

In some examples, the first subnetwork 152a may be used to generate the first plurality of facial feature representations (of the first set of facial feature representations) based upon the plurality of augmented images 118 and the second subnetwork 152b may be used to generate the first facial feature representation (of the first set of facial feature representations) based upon the first image 108. For example, the plurality of augmented images 118 may be input to the first subnetwork 152a (e.g., the first subnetwork 152a generates the first plurality of facial feature representations based upon the plurality of augmented images 118) and the first image 108 may be input to the second subnetwork 152b (e.g., the second subnetwork 152b generates the first facial feature representation based upon the first image 108).

In an example, the first plurality of facial feature representations may be generated separately and/or individually. For example, each augmented image of the plurality of augmented images 118 may be separately and/or individually input to the first subnetwork 152a, wherein the first subnetwork 152a may generate a facial feature representation (of the first plurality of facial feature representations) based upon the augmented image. For example, for each augmented image of the plurality of augmented images 118, the first subnetwork 152a may generate a facial feature representation (of the first plurality of facial feature representations) based upon the augmented image.

In an example, a first augmented image of the first plurality of augmented images 118 may be input to the first subnetwork 152a, wherein the first subnetwork 152a generates a second facial feature representation 172 (of the first plurality of facial feature representations) based upon the first augmented image. The first augmented image may be input to each convolution filter block of the first instance of the plurality of convolution filter blocks 154a (e.g., the first augmented image may be input to each of the first convolution filter block 156a, the second convolution filter block 158a, the third convolution filter block 160a, the fourth convolution filter block 162a and/or the fifth convolution filter block 164a). The plurality of convolution filter blocks 154a output a plurality of region-focused facial feature representations, based upon the first augmented image, focused on different sets of facial regions. For example, each convolution filter block of the plurality of convolution filter blocks 154a outputs, based upon the first augmented image, a region-focused facial feature representation that is focused on a set of one or more facial regions of the plurality of sets of facial regions. For example, the first convolution filter block 156a may generate a region-focused facial feature representation (of the plurality of region-focused facial feature representations) that is focused on the first set of facial regions, the second convolution filter block 158a may generate a region-focused facial feature representation (of the plurality of region-focused facial feature representations) that is focused on the second set of facial regions, etc. In some examples, the conditional attention layer 166a may determine a plurality of weights associated with the plurality of region-focused facial feature representations, wherein each weight of the plurality of weights is associated with (e.g., applicable to) a region-focused facial feature representation of the plurality of region-focused facial feature representations. The conditional attention layer 166a may determine the plurality of weights based upon the plurality of region-focused facial feature representations. The second facial feature representation 172 may be generated based upon the plurality of region-focused facial feature representations and/or the plurality of weights. In some examples, the plurality of weights and/or the plurality of region-focused facial feature representations are input to a combination module 168a (e.g., the conditional attention layer 166a may output the plurality of weights to the combination module 168a and/or the plurality of convolution filter blocks 154a may output the plurality of region-focused facial feature representations to the combination module 168a). For example, the combination module 168a may be configured to combine region-focused facial feature representations of the plurality of region-focused facial feature representations with corresponding weights of the plurality of weights, respectively, to generate a plurality of weighted region-focused facial feature representations. For example, for each region-focused facial feature representation of the plurality of region-focused facial feature representations, the region-focused facial feature representation may be combined with (e.g., multiplied by) a weight (of the plurality of weights) that is applicable to the region-focused facial feature representation to generate a weighted region-focused facial feature representations of the plurality of weighted region-focused facial feature representations. The plurality of weighted region-focused facial feature representations may be input to a feature extraction module 170a (e.g., feature normalization and/or extraction module), wherein the feature extraction module 170a may generate the second facial feature representation 172 based upon the plurality of weighted region-focused facial feature representations. In an example, the feature extraction module 170a may comprise a summation module configured to perform a summation of the plurality of weighted region-focused facial feature representations to generate the second facial feature representation 172 (e.g., the second facial feature representation 172 may correspond to a sum of the plurality of weighted region-focused facial feature representations). It may be appreciated that other facial feature representations of the first plurality of facial feature representations (other than the second facial feature representation 172) may be generated using one or more of the techniques provided herein with respect to generating the second facial feature representation 172.

In an example, the first image 108 may be input to the second subnetwork 152b, wherein the second subnetwork 152b generates the first facial feature representation (shown with reference number 174) based upon the first image 108. The first image 108 may be input to each convolution filter block of the second instance of the plurality of convolution filter blocks 154b. The plurality of convolution filter blocks 154b output a plurality of region-focused facial feature representations, based upon the first image 108, focused on different sets of facial regions. In some examples, the conditional attention layer 166b may determine a plurality of weights associated with the plurality of region-focused facial feature representations, wherein each weight of the plurality of weights is associated with (e.g., applicable to) a region-focused facial feature representation of the plurality of region-focused facial feature representations. The conditional attention layer 166b may determine the plurality of weights based upon the plurality of region-focused facial feature representations. The first facial feature representation 174 may be generated based upon the plurality of region-focused facial feature representations and/or the plurality of weights. For example, the first facial feature representation 174 may be generated, based upon the plurality of region-focused facial feature representations and/or the plurality of weights, using a combination module 168b and/or a feature extraction module 170b (e.g., feature normalization and/or extraction module), such as using one or more of the techniques described with respect to generating the second facial feature representation 172.

In some examples, facial feature representations of the first set of facial feature representations are vector representations, such as embeddings. In an example, facial feature representations of the first set of facial feature representations are one-dimensional vector representations. Embodiments are contemplated in which facial feature representations of the first set of facial feature representations are multi-dimensional vector representations.

In some examples, facial feature representations generated using the machine learning model may be used to train the machine learning model. In an example, the machine learning model may be used to: (i) generate a third facial feature representation based upon a source image; and/or (ii) generate a fourth facial feature representation based upon an augmented image that is generated based upon the source image. Accordingly, the third facial feature representation and the fourth facial feature representation are both generated based upon images of a single person. An example of the source image is the first image 108 and/or an example of the augmented image is an image of the plurality of augmented images 118. The third facial feature representation may be generated using the second subnetwork 152b (such as using one or more of the techniques provided herein with respect to generating the first facial feature representation 174 using the second subnetwork 152b) and/or the fourth facial representation may be generated using the first subnetwork 152a (such as using one or more of the techniques provided herein with respect to generating the second facial feature representation 172 using the first subnetwork 152a). The third facial feature representation and the fourth facial feature representation may be input to a loss calculation module 176 configured to determine a loss value based upon the third facial feature representation and the fourth facial feature representation. In some examples, the loss value may be a triplet loss value. In some examples, the loss value may be based upon (e.g., equal to) a Euclidean loss that is determined based upon the third facial feature representation and the fourth facial feature representation (e.g., the Euclidean loss may correspond to a Euclidean distance between the third facial feature representation and the fourth facial feature representation). In some examples, the loss value may be based upon (e.g., equal to) an angle loss (e.g., Cosine loss) that is determined based upon the third facial feature representation and the fourth facial feature representation. In an example, the loss value may be based upon the Euclidean loss and the angle loss (e.g., the loss value may correspond to a sum of the Euclidean loss and the angle loss). One or more weights of the machine learning model may be modified based upon the loss value (e.g., weights of the machine learning model may be modified via backpropagation). For example, the one or more weights may be modified to increase an accuracy in generation of facial feature representations, such that when two facial feature representations associated with images of the same person are generated (such as the first facial feature representation 174 and the second facial feature representation 172), a loss value between the two facial feature representations is reduced. In some examples, the one or more weights that are modified during training of the machine learning model may comprise one or more weights of the conditional attention layer. In some examples, weights of convolution filter blocks of the machine learning model (e.g., weights of the first instance of the plurality of convolution filter blocks 154a and/or the second instance of the plurality of convolution filter blocks 154b) may not be modified during training of the machine learning model. For example, one, some and/or all convolution filter blocks of the machine learning model may be frozen during training of the machine learning model. Alternatively and/or additionally, one, some and/or all convolution filter blocks, of the machine learning model, that are used to generate region-focused facial feature representations, may be frozen during training of the machine learning model (e.g., the first instance of the plurality of convolution filter blocks 154a and/or the second instance of the plurality of convolution filter blocks 154b may be frozen during training of the machine learning model). A convolution filter block that is frozen during training of the machine learning model may not undergo modifications (e.g., modifications to weights and/or parameters of the convolution filter block) during training of the machine learning model. In some examples, convolution filter blocks of the machine learning model (e.g., the first instance of the plurality of convolution filter blocks 154a and/or the second instance of the plurality of convolution filter blocks 154b) may be pre-trained (and/or knowledge of the convolution filter blocks of the machine learning model may be injected from a pre-trained model, such as a custom pre-trained model).

FIG. 1D illustrates a model architecture of the machine learning model, such as a model architecture of the first subnetwork 152a of the machine learning model. At least some of the features and/or techniques provided herein with respect to the first subnetwork 152a (such as shown in and/or described with respect to FIG. 1D) may be applicable to the second subnetwork 152b. As shown in FIG. 1D, an image (e.g., an augmented image of the plurality of augmented images 118) may be input to an input layer 184 of the first subnetwork 152a. The input layer 184 may generate an output based upon the received image, wherein the output is input to each convolution filter block of the first instance of the plurality of convolution filter blocks 154a. In the example shown in FIG. 1D, each convolution filter block of one, some and/or all convolution filter blocks of the plurality of convolution filter blocks 154a may comprise a convolution filter element (e.g., a convolution filter layer), a max pooling element (e.g., a max pooling layer) and/or a flatten element (e.g., a flatten layer). In an example, the convolution filter element is configured to filter the output from the input layer 184 to generate a representation (e.g., a vector representation, such as a multi-dimensional vector representation) that focuses on one or more facial regions, wherein the representation may be passed through the max pooling element and/or the flatten element to generate a region-focused facial feature representation. For example, the max pooling element may down-sample the representation to generate a down-sampled representation. The flatten element may flatten the down-sampled representation to generate the region-focused facial feature representation (e.g., the region-focused facial feature representation may be a one-dimensional vector representation). Accordingly, each convolution filter block of the plurality of convolution filter blocks 154a may generate a one-dimensional region-focused facial feature representation focused on one or more facial regions (e.g., the one-dimensional region-focused facial feature representation may have a length of 128 features or other length), wherein a plurality of one-dimensional region-focused facial feature representation generated by the plurality of convolution filter blocks 154a may be used to generate a facial feature representation (e.g., the second facial feature representation 172) associated with the received image using the conditional attention layer 166a and/or the feature extraction module 170a (e.g., the facial feature representation, such as the second facial feature representation 172, may have a length of 256 or other length).

Embodiments are contemplated in which all facial feature representations of the first set of facial feature representations are generated using the same subnetwork (e.g., the first subnetwork 152a or the second subnetwork 154b). In some examples, the first set of facial feature representations may be generated using the machine learning model after machine learning model training is performed on the machine learning model (e.g., when the machine learning model is a trained model). In some examples, after machine learning model training is performed on the machine learning model (e.g., when the machine learning model is a trained model), the machine learning model may be broken and/or merely a single subnetwork of the machine learning model (e.g., the first subnetwork 152a or the second subnetwork 154b) may be used and/or considered for inference (e.g., merely a single subnetwork of the machine learning model may be used for performing facial recognition).

In some examples, the first set of facial feature representations (e.g., the first facial feature representation 174 generated based upon the first image 108 and the first plurality of facial feature representations generated based upon the plurality of augmented images 118) is stored in a facial recognition data store. Alternatively and/or additionally, an indication that the first set of facial feature representations are associated with a first identifier corresponding to the first person may be stored in the facial recognition data store. In some examples, the first identifier may correspond to at least one of a name of the first person, an ID code of the first person, etc. The facial recognition data store may comprise a plurality of sets of facial feature representations, comprising the first set of facial feature representations, associated with a plurality of identifiers (e.g., the plurality of identifiers may be associated with a plurality of people, where each identifier of the plurality of identifiers may correspond to a person of the plurality of people and/or where the plurality of identifiers comprise the first identifier). For example, each set of facial feature representations of the plurality of sets of facial feature representations may comprise multiple facial feature representations comprising at least one facial feature representation (e.g., the first facial feature representation 174) generated based upon a source image (e.g., the first image 108) of a person and facial feature representations (e.g., the first plurality of facial feature representations) generated based upon augmented images of the person (e.g., the augmented images may comprise augmented images that are generated based upon the source image, such as the plurality of augmented images 118). The facial recognition data store (e.g., facial feature representations stored in the facial recognition data store) may be used (by the facial recognition system 110, for example) to perform facial recognition (e.g., facial verification). For example, the plurality of sets of facial feature representations of the facial recognition data store may be used to determine (e.g., verify) identities of people in images and/or videos provided to the facial recognition system 110.

At 208, a second image comprising a representation of a face of a second person (e.g., an unknown person) is identified. The facial recognition system 110 may perform facial recognition to determine and/or verify an identity of the second person in the second image.

In some examples, the facial recognition system 110 may receive a second camera signal from a second camera (e.g., the second camera may be the same as the first camera 102 or may be different than the first camera 102). In an example, the second camera may be a camera that is mounted on and/or embedded in a client device (e.g., a laptop, a smartphone, a tablet, a wearable device, etc.). Alternatively and/or additionally, the second camera may be a standalone camera (e.g., the second camera may be a security camera and/or a different type of camera, such as a webcam and/or an external camera, that may or may not be mounted on a client device). In an example, the second camera may be a video surveillance camera (e.g., a CCTV camera), wherein the second camera signal may carry footage (e.g., CCTV footage) captured via the second camera.

In an example, the second camera signal may comprise the second image captured using the second camera. Alternatively and/or additionally, the second camera signal may comprise a second video (e.g., CCTV footage) captured using the second camera, wherein the second image may be extracted from the second video. In some examples, the second video may have a duration of at least about 10 seconds, such as between about 10 seconds and about 20 seconds. The second image may be extracted from the second video (using the image extraction module 106, for example). The second image may correspond to (and/or may be generated based upon) a video frame, of the second video, that the image extraction module 106 selects from among a second plurality of video frames of the second video. In some examples, the second image may be selected from the second plurality of video frames of the second video using one or more of the techniques provided herein with respect to selecting the first image 108 from the plurality of video frames of the video of the first camera signal 104.

At 210, a fifth facial feature representation may be generated based upon the second image. For example, the fifth facial feature representation may be generated using the machine learning model. FIG. 1E illustrates generation of the fifth facial feature representation (shown with reference number 192) based upon the second image (shown with reference number 190). For example, the second image 190 may be input to the machine learning model. The machine learning model (e.g., the neural network model, such as the CNN model) may generate the fifth facial feature representation 192 based upon the second image 190. For example, the fifth facial feature representation 192 may be generated using a subnetwork, such as a single subnetwork, of the machine learning model. The machine learning model may generate the fifth facial feature representation 192 using one or more of the techniques provided herein with respect to generating the first facial feature representation 174 and/or the second facial feature representation 172 (e.g., the plurality of convolution filter blocks 154a, the conditional attention layer 166a, the combination module 168a and/or the feature extraction module 170a may be used to generate the fifth facial feature representation 192).

In some examples, the facial recognition system 110 may use the facial recognition data store to identify the second person in the second image 190 (e.g., the facial recognition system 110 may use the facial recognition data store to determine, based upon the fifth facial feature representation 192, whether or not the second person in the second image 190 corresponds to an identifier of the plurality of identifiers and/or to determine which identifier, of the plurality of identifiers, corresponds to the second person in the second image 190). For example, the fifth facial feature representation 192 may be compared with facial feature representations of the plurality of sets of facial feature representations to generate a plurality of similarity scores. In some examples, an identifier (of the plurality of identifiers) corresponding to the second person in the second image 190 may be determined based upon the plurality of similarity scores. A similarity score of the plurality of similarity scores corresponds to a level of similarity between the fifth facial feature representation 192 and a facial feature representation of the plurality of sets of facial feature representations of the facial recognition data store. In an example, a similarity score of the plurality of similarity scores may be based upon (e.g., equal to) a loss value generated (by the loss calculation module 176, for example) based upon the fifth facial feature representation 192 and a facial feature representation of the plurality of sets of facial feature representations (e.g., the loss value may be generated using one or more of the techniques provided herein with respect to determining a loss value using the loss calculation module 176). In some examples, a magnitude of a similarity score of the plurality of similarity scores may have an inverse relationship with a level of similarity indicated by the similarity score (e.g., a higher similarity score corresponds to a lower level of similarity). Embodiments are contemplated in which a higher similarity score corresponds to a higher level of similarity.

FIG. 1F illustrates the fifth facial feature representation 192 and the facial recognition data store (shown with reference number 198) being used to identify the second person in the second image 190. In some examples, the fifth facial feature representation 192 and/or facial feature representations of the plurality of sets of facial feature representations in the facial recognition data store 198 are input to a face identification module 194, of the facial recognition system 110, that is configured to output a face identification indication 196. The face identification indication 196 may be indicative of an identifier, of the plurality of identifiers, corresponding to the second person in the second image 190. Alternatively and/or additionally, in a scenario in which the face identification module 194 does not find an identifier that corresponds to second person in the second image 190, the face identification indication 196 may indicate that: (i) a match has not been found; (ii) an identity of the second person in the second image 190 has not been verified; and/or (iii) the face of the second person does not correspond to an identifier of the plurality of identifiers associated with the plurality of sets of facial feature representations.

In some examples, a similarity score of the plurality of similarity scores may be used to determine whether or not the fifth facial feature representation 192 matches a facial feature representation of the plurality of sets of facial feature representations in the facial recognition data store 198. For example, it may be determined that the fifth facial feature representation 192 matches the facial feature representation based upon a determination that the similarity score meets a threshold similarity score. In an example in which a higher similarity score corresponds to a lower level of similarity between the fifth facial feature representation 192 and the facial feature representation, the similarity score meets the threshold similarity score if the similarity score is lower than the threshold similarity score. In an example in which a higher similarity score corresponds to a higher level of similarity between the fifth facial feature representation 192 and the facial feature representation, the similarity score meets the threshold similarity score if the similarity score is higher than the threshold similarity score.

At 212, based upon the fifth facial feature representation 192 and the first set of facial feature representations (stored in the facial recognition data store), it may be determined that the second person is the first person (corresponding to the first identifier). Based upon the determination that the second person (in the second image 190) corresponds to the first identifier, the face identification indication 196 may be indicative of the first identifier. For example, the plurality of similarity scores may comprise a first set of similarity scores corresponding to levels of similarity between the fifth facial feature representation 192 and facial feature representations of the first set of facial feature representations. For each facial feature representation of the first set of facial feature representations, the first set of similarity scores may comprise a similarity score corresponding to a level of similarity between the fifth facial feature representation 192 and the facial feature representation. For example, the first set of similarity scores may comprise a first similarity score corresponding to a level of similarity between the fifth facial feature representation 192 and the first facial feature representation 174 (generated based upon the first image 108), a second similarity score corresponding to a level of similarity between the fifth facial feature representation 192 and the second facial feature representation 172 of the first plurality of facial feature representations (generated based upon the plurality of augmented images 118), a third similarity score corresponding to a level of similarity between the fifth facial feature representation 192 and a sixth facial feature representation of the first plurality of facial feature representations (generated based upon the plurality of augmented images 118), etc. Based upon the first set of similarity scores, it may be determined that one or more first facial feature representations, of the first set of facial feature representations, match the fifth facial representation 192. For example, a facial feature representation of the one or more first facial feature representations may be determined to match the fifth facial representation 192 based upon a determination that a similarity score (of the first set of similarity scores) indicative of a similarity level between the facial feature representation and the fifth facial feature representation 192 meets the threshold similarity score.

In some examples, it may be determined that the second person (in the second image 190) corresponds to the first identifier (e.g., it may be determined that the second person is the first person corresponding to the first identifier) based upon the determination that the one or more facial feature representations, of the first set of facial feature representations associated with the first identifier, match the fifth feature representation.

Alternatively and/or additionally, it may be determined that the second person (in the second image 190) corresponds to the first identifier (e.g., it may be determined that the second person is the first person corresponding to the first identifier) based upon a determination that a first quantity of facial feature representations, of the one or more facial feature representations (associated with the first identifier) that match the fifth feature representation, meets (e.g., is equal to or exceeds) a threshold quantity of facial feature representations. In an example in which the threshold quantity of facial feature representations is four, it may be determined that the second person (in the second image 190) corresponds to the first identifier based upon a determination that the first quantity of facial feature representations is at least four (e.g., it may be determined that the second person corresponds to the first identifier based upon a determination that at least four facial feature representations, of the first set of facial feature representations, are determined to match the fifth facial feature representation 192).

Alternatively and/or additionally, for each identifier of some and/or all identifiers of the plurality of identifiers (associated with the plurality of sets of facial feature representations stored in the facial recognition data store 198), a quantity of facial feature representations (e.g., facial feature representations associated with the identifier) that match the fifth facial feature representation 192 may be determined (such as using one or more of the techniques provided herein with respect to determining the first quantity of facial feature representations). For example, a plurality of quantities (comprising the first quantity of facial feature representations) associated with the plurality of identifiers may be determined, wherein each quantity of the plurality of quantities: (i) is associated with an identifier of the plurality of identifiers; and/or (ii) corresponds to a quantity of facial feature representations, of a set of facial feature representations associated with the identifier, that are determined to match the fifth facial feature representation 192. It may be determined that the second person (in the second image 190) corresponds to the first identifier based upon a determination that the first quantity of facial feature representations is the highest quantity among the plurality of quantities.

Alternatively and/or additionally, a plurality of scores associated with the plurality of identifiers may be determined. For example, each score of the plurality of scores may be correspond to a likelihood that an identifier, associated with the score, corresponds to the second person in the second image 190. The plurality of scores may comprise a first score associated with the first identifier. The first score may be generated based upon the first quantity of facial feature representations (of the one or more first facial feature representations that are determined to match the fifth facial feature representation 192), the first set of similarity scores (corresponding to levels of similarity between the fifth facial feature representation 192 and facial feature representations of the first set of facial feature representations associated with the first identifier), and/or other information. It may be determined that the second person (in the second image 190) corresponds to the first identifier based upon a determination that the first score is the highest score among the plurality of scores.

Accordingly, using one or more of the techniques provided herein, the facial recognition system 110 may automatically determine that the second person (e.g., unknown person) in the second image 190 corresponds to the first identifier (e.g., the first identifier may correspond to a person's name, an ID code, etc.). Thus, the identity of the second person (as indicated by the first identifier) in the second image 190 may be accurately determined.

In some examples, the face identification indication 196 (indicative of the first identifier, for example) may be transmitted to a logging system. In some examples, based upon the face identification indication 196, the logging system may log a face identification event in a logging data store (e.g., a journal for keeping track of face identification events). For example, information associated with the face identification event may be stored in the logging data store. The information may comprise an indication of the first identifier, a time at which the second image 190 was captured, etc.

In some examples, the person in the second image 190 may be provided with access to at least one of a section of a building (e.g., the person may be allowed to enter the section of the building), restricted information, etc. based upon the determination that the second person in the second image 190 corresponds to the first identifier. In an example, the determination that the person in the second image 190 corresponds to the first identifier may correspond to a verification, by the facial recognition system 110, that a person in the second image 190 is the first person corresponding to the first identifier, wherein based upon the verification, the person in the second image 190 may be provided with access to resources that the first person is authorized to access.

In an example, the facial recognition system 110 may be used to determine and/or verify identities of employees of a company, such as to provide various employees various levels of access according to their respective authorization levels. In an example, facial recognition by the facial recognition system 110 may be used in place of, or in addition to, ID badges carried by the employees and/or one or more other mechanisms for identity verification.

In an example, the facial recognition system 110 may be used to authenticate a user of a client device (e.g., a phone, a laptop, a computer, a wearable device, a smart device, a television, user equipment (UE), any other type of computing device, hardware, etc.). For example, in response to verifying that the person in the second image 190 is the first person corresponding to the first identifier, the client device may provide access to one or more resources stored in the client device that the first person is authorized to access.

In an example, the facial recognition system 110 may be used in a service context (e.g., customers of a store may be identified and/or recognized using the facial recognition system 110, where a frequency with which a customer shops at the store may be determined based upon a quantity of times the customer is recognized, and where customers determined to be frequent customers may be provided with targeted deals and/or offers). For example, the facial recognition system 110 may be used keep track of activity of customers of a store. In an example, the logging data store may be used to determine a frequency with which a customer shops at the store. The customer may be provided with targeted deals and/or offers that are tailored based upon the frequency.

In some examples, the facial recognition system 110 may employ one or more mechanisms to identify and/or mitigate adversarial attacks. In an example, an image (e.g., the first image 108, the second image 190, etc.) to be used for facial recognition may be identified (e.g., the image may be selected from a plurality of video frames of a video, such as the video of the first camera signal 104, the second video of the second camera signal, etc.). In some examples, a heat map of the image and/or the video may be received from one or more sensors, such as one or more infrared sensors of a thermal camera. For example, the one or more sensors (e.g., the one or more infrared sensors of the thermal camera) may capture the heat map while the image and/or the video are captured by a camera (e.g., the first camera 102, the second camera, etc.). In some examples, the heat map may be analyzed to determine whether or not the image or the video show a real person. In an example in which it is determined (based upon the heat map) that the image and/or the video show a real person, the image and/or the video may be used for facial recognition (e.g., using one or more of the techniques provided herein with respect to the first image 108 and/or the second image 190). In some examples, it may be determined that the image and/or the video do not show a real person. For example, an adversarial patch may be utilized by a malicious entity in an attempt to cause the facial recognition system 110 to incorrectly determine that the image and/or video show a person corresponding to an identifier of the plurality of identifiers (e.g., the adversarial patch may be placed in front of the camera by the malicious entity). In response to a determination that the image and/or the video do not show a real person (and/or in response to a determination that an adversarial patch is utilized by a malicious entity), a security notification may be transmitted, by the facial recognition system 110, to a security device, and/or the image and/or the video may not be used for facial recognition. In this way, the adversarial attack may be prevented by the facial recognition system 110. Alternatively and/or additionally, the video may be analyzed to determine differences between video frames of the video, such as differences in position of a person across video frames of the video. In some examples, it may be determined that the video shows a real person based upon a difference in position of the person across video frames of the video exceeding a threshold difference. Alternatively and/or additionally, it may be determined that the video does not show a real person based upon there being no difference in position of the person across video frames of the video and/or based upon a difference in position of the person across video frames of the video being less than the threshold difference (e.g., no motion of the person throughout the video may be an indication that the person in the video is not real and may be a print out of an adversarial patch).

In some examples, at least some of the present disclosure may be performed and/or implemented automatically and/or in real time. For example, at least some of the present disclosure may be performed and/or implemented such that in response to receiving the second camera signal, the face identification indication 196 (indicative of the first identifier corresponding to the first person, for example) is output by the face identification module 194 quickly (e.g., instantly) and/or in real time.

According to some embodiments, a method is provided. The method includes identifying a first image including a representation of a face of a first person; generating, based upon the first image, a plurality of augmented images; generating, based upon the first image and the plurality of augmented images, a first set of facial feature representations including: a first facial feature representation generated based upon the first image, and a plurality of facial feature representations generated based upon the plurality of augmented images, wherein each facial feature representation of the plurality of facial feature representations is generated based upon an image of the plurality of augmented images; identifying a second image including a representation of a face of a second person; generating, based upon the second image, a second facial feature representation; and determining, based upon the second facial feature representation and the first set of facial feature representations, that the second person is the first person.

According to some embodiments, generating the plurality of augmented images includes: generating a first set of one or more augmented images, of the plurality of augmented images, to each include a representation of the face of the first person having an angular position different than an angular position of the face of the first person in the first image; generating a second set of one or more augmented images, of the plurality of augmented images, to each include a representation of the face of the first person in a lighting condition different than a lighting condition of the first image; and/or generating a third set of one or more augmented images, of the plurality of augmented images, to each include one or more unmasked regions and one or more masked regions, wherein generating an augmented image of the third set of one or more augmented images includes masking one or more regions of the first image to generate the augmented image.

According to some embodiments, the third set of one or more augmented images includes: an image in which a nose of the first person is unmasked and one or more facial regions, other than the nose of the first person, are masked;

an image in which eyes of the first person are unmasked and one or more facial regions, other than the eyes of the first person, are masked; an image in which a forehead of the first person is unmasked and one or more facial regions, other than the forehead of the first person, are masked; an image in which a mouth of the first person is unmasked and one or more facial regions, other than the mouth of the first person, are masked; and/or an image in which a jawline of the first person is unmasked and one or more facial regions, other than the jawline of the first person, are masked.

According to some embodiments, generating the plurality of facial feature representations is performed using a neural network model.

According to some embodiments, the neural network model includes: a plurality of convolution filter blocks associated with a plurality of sets of facial regions, wherein each convolution filter block of the plurality of convolution filter blocks is: associated with a set of one or more facial regions of the plurality of sets of facial regions, and configured to generate, based upon an input image, a region-focused facial feature representation focused on the set of one or more facial regions; and a conditional attention layer configured to generate weights associated with region-focused facial feature representations output by the plurality of convolution filter blocks.

According to some embodiments, a third facial feature representation of the plurality of facial feature representations is based upon a first augmented image of the plurality of augmented images, wherein generating the third facial feature representation includes: generating, based upon the first augmented image and using the plurality of convolution filter blocks, a plurality of region-focused facial feature representations including: a first region-focused facial feature representation generated using a first convolution filter block, of the plurality of convolution filter blocks, associated with a first set of one or more facial regions of the plurality of sets of facial regions, wherein the first region-focused facial feature representation is focused on the first set of one or more facial regions, and a second region-focused facial feature representation generated using a second convolution filter block, of the plurality of convolution filter blocks, associated with a second set of one or more facial regions of the plurality of sets of facial regions, wherein the second region-focused facial feature representation is focused on the second set of one or more facial regions; determining, using the conditional attention layer, a plurality of weights associated with the plurality of region-focused facial feature representations, wherein each weight of the plurality of weights is associated with a facial feature representation of the plurality of region-focused facial feature representations; and generating the third facial feature representation based upon the plurality of region-focused facial feature representations and the plurality of weights.

According to some embodiments, each convolution filter block of the plurality of convolution filter blocks includes at least two of: a convolution filter element; a max pooling element; or a flatten element.

According to some embodiments, the method includes receiving a first video from a first camera; analyzing a first plurality of video frames of the first video to determine a first plurality of scores associated with the first plurality of video frames, wherein the first plurality of scores includes: a first score, associated with a first video frame of the first plurality of video frames, generated based upon a lighting condition, a brightness, a sharpness, and/or a smoothness of the first video frame, and a second score, associated with a second video frame of the first plurality of video frames, generated based upon a lighting condition, a brightness, a sharpness, and/or a smoothness of the second video frame; and selecting, based upon the first plurality of scores, the first video frame from among the first plurality of video frames, wherein the first image is generated based upon the first video frame, or the first image is the first video frame.

According to some embodiments, the method includes receiving a second video from a second camera; analyzing a second plurality of video frames of the second video to determine a second plurality of scores associated with the second plurality of video frames, wherein the second plurality of scores includes: a third score, associated with a third video frame of the second plurality of video frames, generated based upon a lighting condition, a brightness, a sharpness, and/or a smoothness of the third video frame, and a fourth score, associated with a fourth video frame of the second plurality of video frames, generated based upon a lighting condition, a brightness, a sharpness, and/or a smoothness of the fourth video frame; and selecting, based upon the second plurality of scores, the third video frame from among the second plurality of video frames, wherein the second image is generated based upon the third video frame, or the second image is the third video frame.

According to some embodiments, the method includes training the neural network model, wherein the training includes: generating, using the neural network model, a third facial feature representation based upon a source image; generating, using the neural network model, a fourth facial feature representation based upon an augmented image of a second plurality of augmented images generated based upon the source image; determining a loss value based upon the third facial feature representation and the fourth facial feature representation; and modifying one or more weights of the neural network model based upon the loss value.

According to some embodiments, the neural network model has a Siamese neural network architecture; the third facial feature representation is generated using a first subnetwork of the neural network model; the fourth facial feature representation is generated using a second subnetwork of the neural network model; and weights of the first subnetwork and/or a configuration of the first subnetwork are identical to weights of the second subnetwork and/or a configuration of the second subnetwork.

According to some embodiments, each subnetwork, of the first subnetwork and the second subnetwork, includes: the plurality of convolution filter blocks, or a second plurality of convolution filter blocks identical to the plurality of convolution filter blocks; and the plurality of convolution filter blocks and/or the second plurality of convolution filter blocks are frozen while the neural network model is trained.

According to some embodiments, the method includes storing, in a facial recognition data store, the first set of facial feature representations and an indication that the first set of facial feature representations are associated with a first identifier corresponding to the first person, wherein: a plurality of sets of facial feature representations associated with a plurality of identifiers are stored in the facial recognition data store; the plurality of sets of facial feature representations includes the first set of facial feature representations associated with the first identifier; and determining that the second person is the first person includes comparing the second facial feature representation with facial feature representations of the plurality of sets of facial feature representations to generate a plurality of similarity scores, wherein a similarity score of the plurality of similarity scores corresponds to a level of similarity between the second facial feature representation and a facial feature representation of the plurality of sets of facial feature representations, and determining that the second person is the first person is based upon the plurality of similarity scores.

According to some embodiments, determining that the second person is the first person includes comparing the second facial feature representation with facial feature representations of the first set of facial feature representations to generate a set of similarity scores, wherein for each facial feature representation of the first set of facial feature representations, the set of similarity scores comprises a similarity score corresponding to a level of similarity between the facial feature representation and the second facial feature representation, and determining that the second person is the first person is based upon the set of similarity scores.

According to some embodiments, a non-transitory computer-readable medium, storing instructions that when executed perform operations, is provided. The operations include identifying a first image including a representation of a face of a first person; generating, based upon the first image, a plurality of augmented images; generating, based upon the first image and the plurality of augmented images, a first set of facial feature representations including: a first facial feature representation generated based upon the first image, and a plurality of facial feature representations generated based upon the plurality of augmented images, wherein each facial feature representation of the plurality of facial feature representations is generated based upon an image of the plurality of augmented images; identifying a second image including a representation of a face of a second person; generating, based upon the second image, a second facial feature representation; and determining, based upon the second facial feature representation and the first set of facial feature representations, that the second person is the first person.

According to some embodiments, generating the plurality of augmented images includes: generating a first set of one or more augmented images, of the plurality of augmented images, to each include a representation of the face of the first person having an angular position different than an angular position of the face of the first person in the first image; generating a second set of one or more augmented images, of the plurality of augmented images, to each include a representation of the face of the first person in a lighting condition different than a lighting condition of the first image; and/or generating a third set of one or more augmented images, of the plurality of augmented images, to each include one or more unmasked regions and one or more masked regions, wherein generating an augmented image of the third set of one or more augmented images includes masking one or more regions of the first image to generate the augmented image.

According to some embodiments, the third set of one or more augmented images includes: an image in which a nose of the first person is unmasked and one or more facial regions, other than the nose of the first person, are masked; an image in which eyes of the first person are unmasked and one or more facial regions, other than the eyes of the first person, are masked; an image in which a forehead of the first person is unmasked and one or more facial regions, other than the forehead of the first person, are masked; an image in which a mouth of the first person is unmasked and one or more facial regions, other than the mouth of the first person, are masked; and/or an image in which a jawline of the first person is unmasked and one or more facial regions, other than the jawline of the first person, are masked.

According to some embodiments, generating the plurality of facial feature representations is performed using a neural network model. The neural network model includes: a plurality of convolution filter blocks associated with a plurality of sets of facial regions, wherein each convolution filter block of the plurality of convolution filter blocks is: associated with a set of one or more facial regions of the plurality of sets of facial regions, and configured to generate, based upon an input image, a region-focused facial feature representation focused on the set of one or more facial regions; and a conditional attention layer configured to generate weights associated with region-focused facial feature representations output by the plurality of convolution filter blocks.

According to some embodiments, a third facial feature representation of the plurality of facial feature representations is based upon a first augmented image of the plurality of augmented images, wherein generating the third facial feature representation includes: generating, based upon the first augmented image and using the plurality of convolution filter blocks, a plurality of region-focused facial feature representations including: a first region-focused facial feature representation generated using a first convolution filter block, of the plurality of convolution filter blocks, associated with a first set of one or more facial regions of the plurality of sets of facial regions, wherein the first region-focused facial feature representation is focused on the first set of one or more facial regions, and a second region-focused facial feature representation generated using a second convolution filter block, of the plurality of convolution filter blocks, associated with a second set of one or more facial regions of the plurality of sets of facial regions, wherein the second region-focused facial feature representation is focused on the second set of one or more facial regions; determining, using the conditional attention layer, a plurality of weights associated with the plurality of region-focused facial feature representations, wherein each weight of the plurality of weights is associated with a facial feature representation of the plurality of region-focused facial feature representations; and generating the third facial feature representation based upon the plurality of region-focused facial feature representations and the plurality of weights.

According to some embodiments, a device is provided. The device includes a processor coupled to memory, the processor configured to execute instructions to perform operations. The operations include identifying a first image including a representation of a face of a first person; generating, based upon the first image, a plurality of augmented images, wherein generating the plurality of augmented images includes augmenting the first image using an image generation engine to generate an image of the plurality of augmented images; generating, based upon the first image and the plurality of augmented images, a first set of facial feature representations including: a first facial feature representation generated based upon the first image, and a plurality of facial feature representations generated based upon the plurality of augmented images, wherein each facial feature representation of the plurality of facial feature representations is generated based upon an image of the plurality of augmented images; storing, in a facial recognition data store, the first set of facial feature representations and an indication that the first set of facial feature representations are associated with a first identifier corresponding to the first person; identifying a second image including a representation of a face of a second person; generating, based upon the second image, a second facial feature representation; and determining, based upon the second facial feature representation and the first set of facial feature representations stored in the facial recognition data store, that the second person is the first person corresponding to the first identifier.

Figure 3:
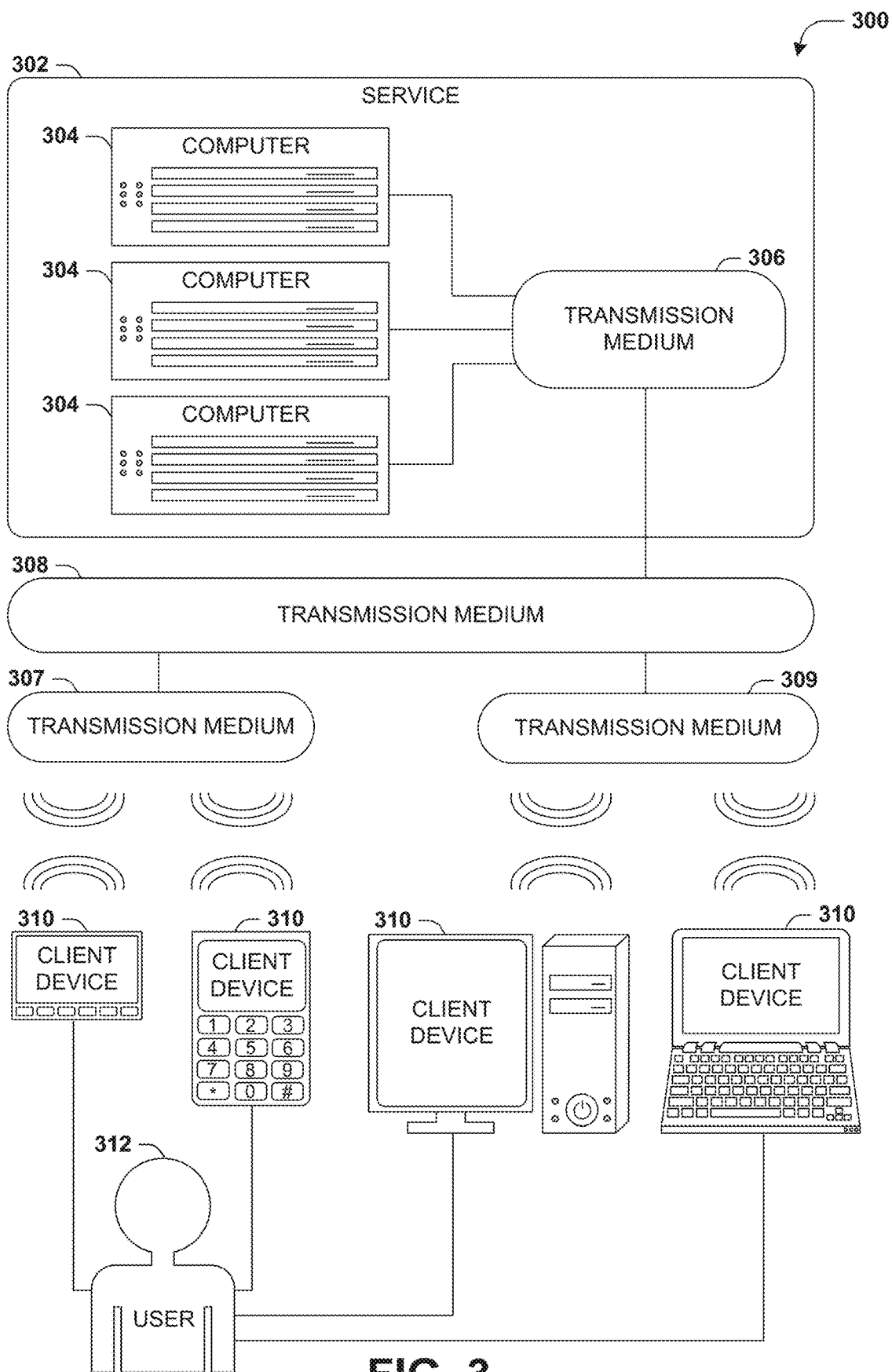
FIG. 3 is an illustration of a scenario involving various examples of transmission mediums that may be used to communicatively couple computers and clients.

FIG. 3 is an interaction diagram of a scenario 300 illustrating a service 302 provided by a set of computers 304 to a set of client devices 310 (e.g., UEs) via various types of transmission mediums. The computers 304 and/or client devices 310 may be capable of transmitting, receiving, processing, and/or storing many types of signals, such as in memory as physical memory states.

The computers 304 of the service 302 may be communicatively coupled together, such as for exchange of communications using a transmission medium 306. The transmission medium 306 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 302.

Likewise, the transmission medium 306 may comprise one or more sub-networks, such as may employ different architectures, may be compliant or compatible with differing protocols and/or may interoperate within the transmission medium 306. Additionally, various types of transmission medium 306 may be interconnected (e.g., a router may provide a link between otherwise separate and independent transmission medium 306).

In scenario 300 of FIG. 3, the transmission medium 306 of the service 302 is connected to a transmission medium 308 that allows the service 302 to exchange data with other services 302 and/or client devices 310. The transmission medium 308 may encompass various combinations of devices with varying levels of distribution and exposure, such as a public wide-area network and/or a private network (e.g., a virtual private network (VPN) of a distributed enterprise).

In the scenario 300 of FIG. 3, the service 302 may be accessed via the transmission medium 308 by a user 312 of one or more client devices 310, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 310 may communicate with the service 302 via various communicative couplings to the transmission medium 308. As a first such example, one or more client devices 310 may comprise a cellular communicator and may communicate with the service 302 by connecting to the transmission medium 308 via a transmission medium 307 provided by a cellular provider. As a second such example, one or more client devices 310 may communicate with the service 302 by connecting to the transmission medium 308 via a transmission medium 309 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the computers 304 and the client devices 310 may communicate over various types of transmission mediums.

Figure 4:
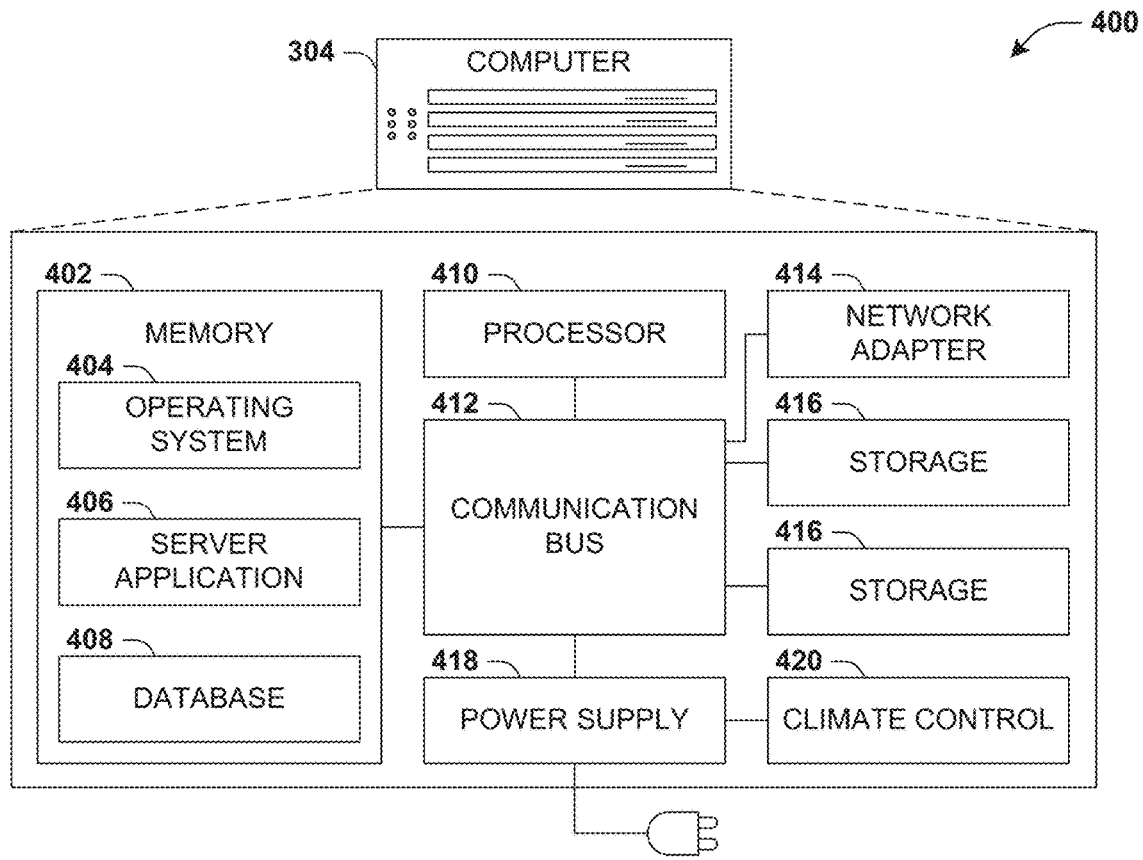
FIG. 4 is an illustration of a scenario involving an example configuration of a computer that may utilize and/or implement at least a portion of the techniques presented herein.

FIG. 4 presents a schematic architecture diagram 400 of a computer 304 that may utilize at least a portion of the techniques provided herein. Such a computer 304 may vary widely in configuration or capabilities, alone or in conjunction with other computers, in order to provide a service such as the service 302.

The computer 304 may comprise one or more processors 410 that process instructions. The one or more processors 410 may optionally include a plurality of cores; one or more coprocessors, such as a mathematics coprocessor or an integrated graphical processing unit (GPU); and/or one or more layers of local cache memory. The computer 304 may comprise memory 402 storing various forms of applications, such as an operating system 404; one or more computer applications 406; and/or various forms of data, such as a database 408 or a file system. The computer 304 may comprise a variety of peripheral components, such as a wired and/or wireless network adapter 414 connectible to a local area network and/or wide area network; one or more storage components 416, such as a hard disk drive, a solid-state storage device (SSD), a flash memory device, and/or a magnetic and/or optical disk reader.

The computer 304 may comprise a mainboard featuring one or more communication buses 412 that interconnect the processor 410, the memory 402, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 412 may interconnect the computer 304 with at least one other computer. Other components that may optionally be included with the computer 304 (though not shown in the schematic architecture diagram 400 of FIG. 4) include a display; a display adapter, such as a graphical processing unit (GPU); input peripherals, such as a keyboard and/or mouse; and a flash memory device that may store a basic input/output system (BIOS) routine that facilitates booting the computer 304 to a state of readiness.

The computer 304 may operate in various physical enclosures, such as a desktop or tower, and/or may be integrated with a display as an "all-in-one" device. The computer 304 may be mounted horizontally and/or in a cabinet or rack, and/or may simply comprise an interconnected set of components. The computer 304 may comprise a dedicated and/or shared power supply 418 that supplies and/or regulates power for the other components. The computer 304 may provide power to and/or receive power from another computer and/or other devices. The computer 304 may comprise a shared and/or dedicated climate control unit 420 that regulates climate properties, such as temperature, humidity, and/or airflow. Many such computers 304 may be configured and/or adapted to utilize at least a portion of the techniques presented herein.

Figure 5:
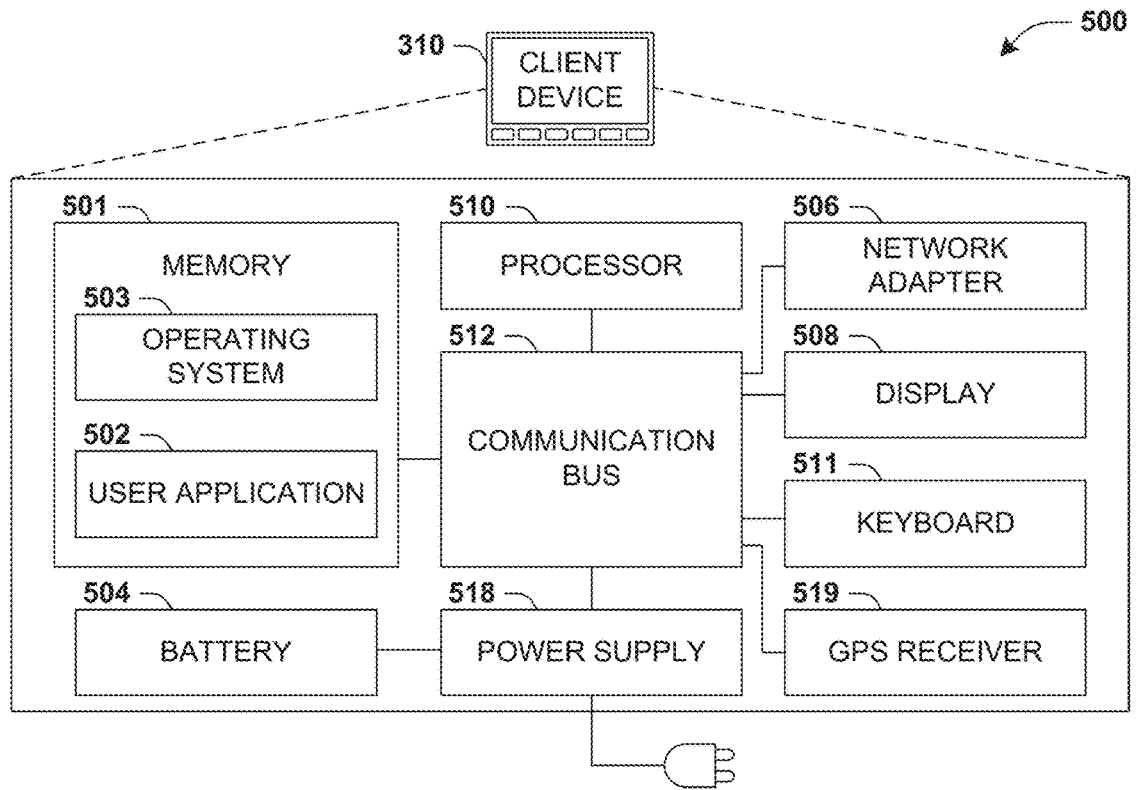
FIG. 5 is an illustration of a scenario involving an example configuration of a client that may utilize and/or implement at least a portion of the techniques presented herein.

FIG. 5 presents a schematic architecture diagram 500 of a client device 310 whereupon at least a portion of the techniques presented herein may be implemented. Such a client device 310 may vary widely in configuration or capabilities, in order to provide a variety of functionality to a user such as the user 312. The client device 310 may be provided in a variety of form factors, such as a desktop or tower workstation; an "all-in-one" device integrated with a display 508; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 310 may serve the user in a variety of roles, such as a workstation, kiosk, media player, gaming device, and/or appliance.

The client device 310 may comprise one or more processors 510 that process instructions. The one or more processors 510 may optionally include a plurality of cores; one or more coprocessors, such as a mathematics coprocessor or an integrated graphical processing unit (GPU); and/or one or more layers of local cache memory. The client device 310 may comprise memory 501 storing various forms of applications, such as an operating system 503; one or more user applications 502, such as document applications, media applications, file and/or data access applications, communication applications such as web browsers and/or email clients, utilities, and/or games; and/or drivers for various peripherals. The client device 310 may comprise a variety of peripheral components, such as a wired and/or wireless network adapter 506 connectible to a local area network and/or wide area network; one or more output components, such as a display 508 coupled with a display adapter (optionally including a graphical processing unit (GPU)), a sound adapter coupled with a speaker, and/or a printer; input devices for receiving input from the user, such as a keyboard 511, a mouse, a microphone, a camera, and/or a touch-sensitive component of the display 508; and/or environmental sensors, such as a global positioning system (GPS) receiver 519 that detects the location, velocity, and/or acceleration of the client device 310, a compass, accelerometer, and/or gyroscope that detects a physical orientation of the client device 310. Other components that may optionally be included with the client device 310 (though not shown in the schematic architecture diagram 500 of FIG. 5) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 310 to a state of readiness; and a climate control unit that regulates climate properties, such as temperature, humidity, and airflow.

The client device 310 may comprise a mainboard featuring one or more communication buses 512 that interconnect the processor 510, the memory 501, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 310 may comprise a dedicated and/or shared power supply 518 that supplies and/or regulates power for other components, and/or a battery 504 that stores power for use while the client device 310 is not connected to a power source via the power supply 518. The client device 310 may provide power to and/or receive power from other client devices.

Figure 6:
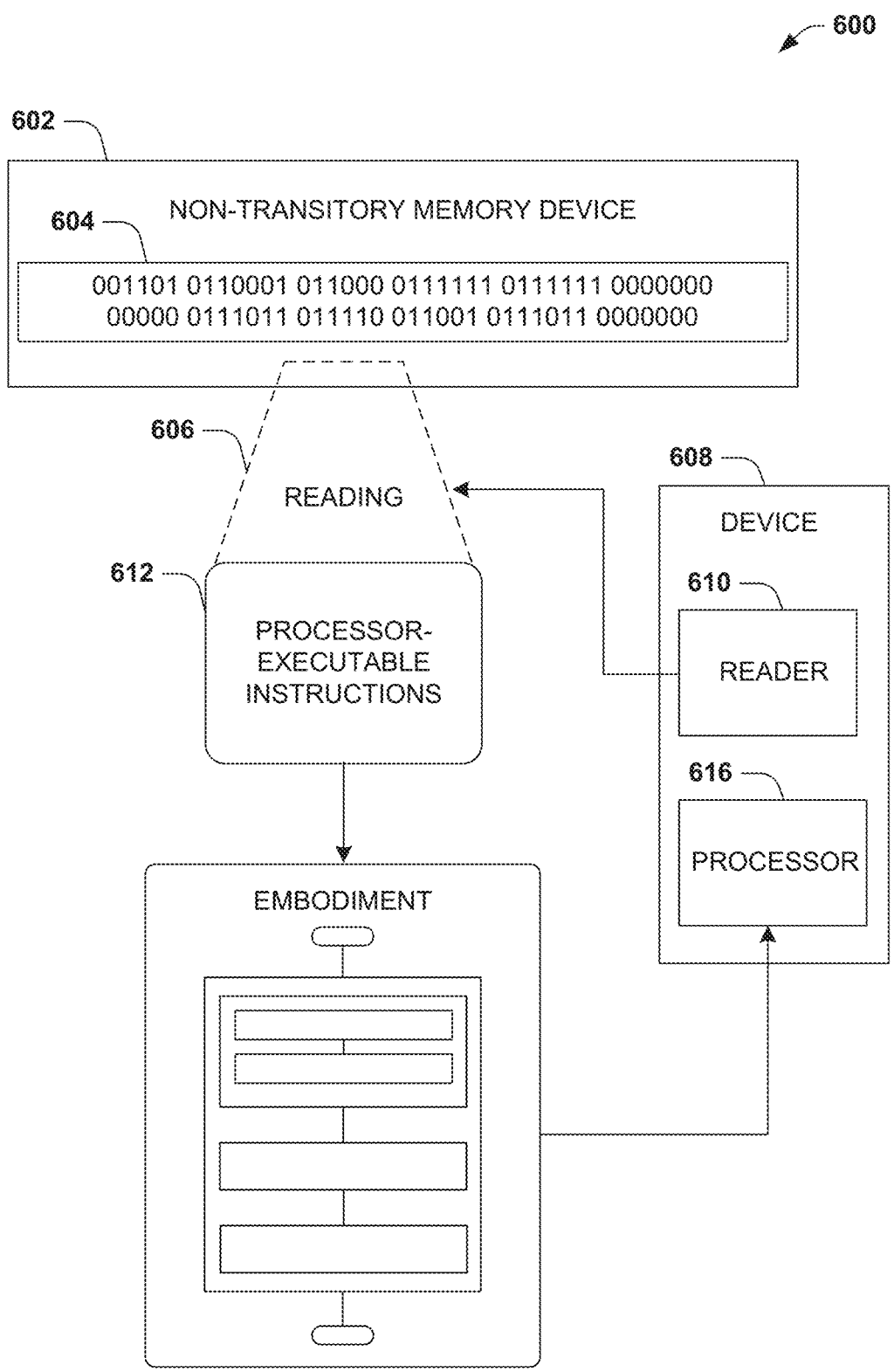
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed cause performance of operations, such as at least some of the example method 200 of FIG. 2, for example. In some embodiments, the processor-executable instructions 612 are configured to cause implementation of a system, such as at least some of the example system 101 of FIGS. 1A-1F, for example.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

What is claimed is:

1. A method, comprising:
    identifying a first image comprising a representation of a face of a first person;
    generating, based upon the first image, a plurality of augmented images;
    generating, based upon the first image and the plurality of augmented images, a first set of facial feature representations comprising:
        a first facial feature representation generated based upon the first image; and
        a plurality of facial feature representations generated based upon the plurality of augmented images, wherein each facial feature representation of the plurality of facial feature representations is generated based upon an image of the plurality of augmented images;
    identifying a second image comprising a representation of a face of a second person;
    generating, based upon the second image, a second facial feature representation; and
    determining, based upon (i) the second facial feature representation associated with the second image comprising the representation of the face of the second person and (ii) the first set of facial feature representations associated with the plurality of augmented images generated based upon the first image comprising the representation of the face of the first person, that the second person is the first person.

2. The method of claim 1, wherein generating the plurality of augmented images comprises at least one of:
    generating a first set of one or more augmented images, of the plurality of augmented images, to each comprise a representation of the face of the first person having an angular position different than an angular position of the face of the first person in the first image;
    generating a second set of one or more augmented images, of the plurality of augmented images, to each comprise a representation of the face of the first person in a lighting condition different than a lighting condition of the first image; or
    generating a third set of one or more augmented images, of the plurality of augmented images, to each comprise one or more unmasked regions and one or more masked regions, wherein generating an augmented image of the third set of one or more augmented images comprises masking one or more regions of the first image to generate the augmented image.

3. The method of claim 2, wherein the third set of one or more augmented images comprises at least one of:
    an image in which a nose of the first person is unmasked and one or more facial regions, other than the nose of the first person, are masked;
    an image in which eyes of the first person are unmasked and one or more facial regions, other than the eyes of the first person, are masked;
    an image in which a forehead of the first person is unmasked and one or more facial regions, other than the forehead of the first person, are masked;
    an image in which a mouth of the first person is unmasked and one or more facial regions, other than the mouth of the first person, are masked; or
    an image in which a jawline of the first person is unmasked and one or more facial regions, other than the jawline of the first person, are masked.

4. The method of claim 1, wherein generating the plurality of facial feature representations is performed using a neural network model.

5. The method of claim 4, wherein the neural network model comprises:
    a plurality of convolution filter blocks associated with a plurality of sets of facial regions, wherein each convolution filter block of the plurality of convolution filter blocks is:
        associated with a set of one or more facial regions of the plurality of sets of facial regions; and configured to generate, based upon an input image, a region-focused facial feature representation focused on the set of one or more facial regions; and a conditional attention layer configured to generate weights associated with region-focused facial feature representations output by the plurality of convolution filter blocks.

6. The method of claim 5, wherein:

a third facial feature representation of the plurality of facial feature representations is based upon a first augmented image of the plurality of augmented images; and generating the third facial feature representation comprises:

generating, based upon the first augmented image and using the plurality of convolution filter blocks, a plurality of region-focused facial feature representations comprising:

a first region-focused facial feature representation generated using a first convolution filter block, of the plurality of convolution filter blocks, associated with a first set of one or more facial regions of the plurality of sets of facial regions, wherein the first region-focused facial feature representation is focused on the first set of one or more facial regions; and a second region-focused facial feature representation generated using a second convolution filter block, of the plurality of convolution filter blocks, associated with a second set of one or more facial regions of the plurality of sets of facial regions, wherein the second region-focused facial feature representation is focused on the second set of one or more facial regions;

determining, using the conditional attention layer, a plurality of weights associated with the plurality of region-focused facial feature representations, wherein each weight of the plurality of weights is associated with a facial feature representation of the plurality of region-focused facial feature representations; and generating the third facial feature representation based upon the plurality of region-focused facial feature representations and the plurality of weights.

7. The method of claim 6, wherein each convolution filter block of the plurality of convolution filter blocks comprises at least two of:

a convolution filter element;

a max pooling element; or a flatten element.

8. The method of claim 5, comprising:

training the neural network model, wherein the training comprises:

generating, using the neural network model, a third facial feature representation based upon a source image;

generating, using the neural network model, a fourth facial feature representation based upon an augmented image of a second plurality of augmented images generated based upon the source image;

determining a loss value based upon the third facial feature representation and the fourth facial feature representation; and modifying one or more weights of the neural network model based upon the loss value.

9. The method of claim 8, wherein:

the neural network model has a Siamese neural network architecture;

the third facial feature representation is generated using a first subnetwork of the neural network model;

the fourth facial feature representation is generated using a second subnetwork of the neural network model; and at least one of weights of the first subnetwork or a configuration of the first subnetwork are identical to at least one of weights of the second subnetwork or a configuration of the second subnetwork.

10. The method of claim 9, wherein:

each subnetwork, of the first subnetwork and the second subnetwork, comprises:

the plurality of convolution filter blocks; or a second plurality of convolution filter blocks identical to the plurality of convolution filter blocks; and at least one of the plurality of convolution filter blocks or the second plurality of convolution filter blocks are frozen while the neural network model is trained.

11. The method of claim 1, comprising:

receiving a first video from a first camera;

analyzing a first plurality of video frames of the first video to determine a first plurality of scores associated with the first plurality of video frames, wherein the first plurality of scores comprises:

a first score, associated with a first video frame of the first plurality of video frames, generated based upon at least one of a lighting condition, a brightness, or a sharpness of the first video frame; and a second score, associated with a second video frame of the first plurality of video frames, generated based upon at least one of a lighting condition, a brightness, or a sharpness of the second video frame; and selecting, based upon the first plurality of scores, the first video frame from among the first plurality of video frames, wherein:

the first image is generated based upon the first video frame; or the first image is the first video frame.

12. The method of claim 11, comprising:

receiving a second video from a second camera;

analyzing a second plurality of video frames of the second video to determine a second plurality of scores associated with the second plurality of video frames, wherein the second plurality of scores comprises:

a third score, associated with a third video frame of the second plurality of video frames, generated based upon at least one of a lighting condition, a brightness, or a sharpness of the third video frame; and a fourth score, associated with a fourth video frame of the second plurality of video frames, generated based upon at least one of a lighting condition, a brightness, or a sharpness of the fourth video frame; and selecting, based upon the second plurality of scores, the third video frame from among the second plurality of video frames, wherein:

the second image is generated based upon the third video frame; or the second image is the third video frame.

13. The method of claim 1, comprising:

storing, in a facial recognition data store, the first set of facial feature representations and an indication that the first set of facial feature representations are associated with a first identifier corresponding to the first person, wherein:

a plurality of sets of facial feature representations associated with a plurality of identifiers are stored in the facial recognition data store;

the plurality of sets of facial feature representations comprises the first set of facial feature representations associated with the first identifier; and determining that the second person is the first person comprises:

comparing the second facial feature representation with facial feature representations of the plurality of sets of facial feature representations to generate a plurality of similarity scores, wherein:

a similarity score of the plurality of similarity scores corresponds to a level of similarity between the second facial feature representation and a facial feature representation of the plurality of sets of facial feature representations; and determining that the second person is the first person is based upon the plurality of similarity scores.

14. The method of claim 1, wherein:

determining that the second person is the first person comprises:

comparing the second facial feature representation with facial feature representations of the first set of facial feature representations to generate a set of similarity scores, wherein:

for each facial feature representation of the first set of facial feature representations, the set of similarity scores comprises a similarity score corresponding to a level of similarity between the facial feature representation and the second facial feature representation; and determining that the second person is the first person is based upon the set of similarity scores.

15. A non-transitory computer-readable medium storing instructions that when executed perform operations comprising:

identifying a first image comprising a representation of a face of a first person;

generating, based upon the first image, a plurality of augmented images;

generating, based upon the first image and the plurality of augmented images, a first set of facial feature representations comprising:

a first facial feature representation generated based upon the first image; and a plurality of facial feature representations generated based upon the plurality of augmented images, wherein each facial feature representation of the plurality of facial feature representations is generated based upon an image of the plurality of augmented images;

identifying a second image comprising a representation of a face of a second person;

generating, based upon the second image, a second facial feature representation; and determining, based upon (i) the second facial feature representation associated with the second image comprising the representation of the face of the second person and (ii) the first set of facial feature representations associated with the plurality of augmented images generated based upon the first image comprising the representation of the face of the first person, that the second person is the first person.

16. The non-transitory computer-readable medium of claim 15, wherein generating the plurality of augmented images comprises at least one of:

generating a first set of one or more augmented images, of the plurality of augmented images, to each comprise a representation of the face of the first person having an angular position different than an angular position of the face of the first person in the first image;

generating a second set of one or more augmented images, of the plurality of augmented images, to each comprise a representation of the face of the first person in a lighting condition different than a lighting condition of the first image; or generating a third set of one or more augmented images, of the plurality of augmented images, to each comprise one or more unmasked regions and one or more masked regions, wherein generating an augmented image of the third set of one or more augmented images comprises masking one or more regions of the first image to generate the augmented image.

17. The non-transitory computer-readable medium of claim 16, wherein the third set of one or more augmented images comprises at least one of:

an image in which a nose of the first person is unmasked and one or more facial regions, other than the nose of the first person, are masked;

an image in which eyes of the first person are unmasked and one or more facial regions, other than the eyes of the first person, are masked;

an image in which a forehead of the first person is unmasked and one or more facial regions, other than the forehead of the first person, are masked;

an image in which a mouth of the first person is unmasked and one or more facial regions, other than the mouth of the first person, are masked; or an image in which a jawline of the first person is unmasked and one or more facial regions, other than the jawline of the first person, are masked.

18. The non-transitory computer-readable medium of claim 15, wherein:

generating the plurality of facial feature representations is performed using a neural network model; and the neural network model comprises:

a plurality of convolution filter blocks associated with a plurality of sets of facial regions, wherein each convolution filter block of the plurality of convolution filter blocks is:

associated with a set of one or more facial regions of the plurality of sets of facial regions; and configured to generate, based upon an input image, a facial feature representation focused on the set of one or more facial regions; and a conditional attention layer configured to generate weights associated with facial feature representations output by the plurality of convolution filter blocks.

19. The non-transitory computer-readable medium of claim 18, wherein:

a third facial feature representation of the plurality of facial feature representations is based upon a first augmented image of the plurality of augmented images; and generating the third facial feature representation comprises:

generating, based upon the first augmented image and using the plurality of convolution filter blocks, a plurality of region-focused facial feature representations comprising:
- a second region-focused facial feature representation generated using a first convolution filter block, of the plurality of convolution filter blocks, associated with a first set of one or more facial regions of the plurality of sets of facial regions, wherein the second region-focused facial feature representation is focused on the first set of one or more facial regions; and
- a second region-focused facial feature representation generated using a second convolution filter block, of the plurality of convolution filter blocks, associated with a second set of one or more facial regions of the plurality of sets of facial regions, wherein the second region-focused facial feature representation is focused on the second set of one or more facial regions;

determining, using the conditional attention layer, a plurality of weights associated with the plurality of region-focused facial feature representations, wherein each weight of the plurality of weights is associated with a facial feature representation of the plurality of region-focused facial feature representations; and generating the third facial feature representation based upon the plurality of region-focused facial feature representations and the plurality of weights.

20. A device comprising:
a processor coupled to memory, the processor configured to execute instructions to perform operations comprising:
- identifying a first image comprising a representation of a face of a first person;
- generating, based upon the first image, a plurality of augmented images, wherein generating the plurality of augmented images comprises augmenting the first image using an image generation engine to generate an image of the plurality of augmented images;
- generating, based upon the first image and the plurality of augmented images, a first set of facial feature representations comprising:
  - a first facial feature representation generated based upon the first image; and
  - a plurality of facial feature representations generated based upon the plurality of augmented images, wherein each facial feature representation of the plurality of facial feature representations is generated based upon an image of the plurality of augmented images;
- storing, in a facial recognition data store, the first set of facial feature representations and an indication that the first set of facial feature representations are associated with a first identifier corresponding to the first person;
- identifying a second image comprising a representation of a face of a second person;
- generating, based upon the second image, a second facial feature representation; and
- determining, based upon (i) the second facial feature representation associated with the second image comprising the representation of the face of the second person and (ii) the first set of facial feature representations associated with the plurality of augmented images generated based upon the first image comprising the representation of the face of the first person stored in the facial recognition data store, that the second person is the first person corresponding to the first identifier.

* * * * *